(12) United States Patent
Wada et al.

(10) Patent No.: US 6,201,559 B1
(45) Date of Patent: Mar. 13, 2001

(54) METHOD FOR MEASURING THE QUANTITY OF LIGHT EMERGENT FROM AN OPTICAL TIP ARRAY AND IMAGE FORMING APPARATUS PROVIDED WITH AN OPTICAL TIP ARRAY

(75) Inventors: Kenichi Wada, Takatsuki; Tsukasa Yagi, Kobe; Tomohiko Masuda; Ken Matsubara, both of Takatsuki; Yuji Kamoda, Ibaraki; Itaru Saito, Nishinomiya, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/992,810

(22) Filed: Dec. 18, 1997

(30) Foreign Application Priority Data

Dec. 19, 1996 (JP) .................................................... 8-340118
Jun. 2, 1997 (JP) .................................................... 9-114209
Jun. 11, 1997 (JP) .................................................... 9-153602
Sep. 26, 1997 (JP) .................................................... 9-262308

(51) Int. Cl.$^7$ .................................................... B41J 2/435
(52) U.S. Cl. .......................... 347/236; 347/246; 250/205; 250/559.03; 250/559.05
(58) Field of Search .................... 347/130, 117, 347/118, 119, 135, 238, 239, 236, 246, 240, 244; 250/582, 583, 559.03, 559.04, 559.05, 205; 355/68; 358/505

(56) References Cited

U.S. PATENT DOCUMENTS

| 4,455,562 | * | 6/1984 | Dolan et al. .......................... 347/130 |
| 4,998,118 | * | 3/1991 | Ng ....................................... 347/236 |
| 5,218,402 | * | 6/1993 | Beaulieu et al. ...................... 355/38 |
| 5,684,568 | * | 11/1997 | Ishikawa et al. ...................... 355/68 |
| 5,699,103 | * | 12/1997 | Fleming .............................. 347/240 |
| 5,729,361 | * | 3/1998 | Suggs et al. .......................... 358/505 |

FOREIGN PATENT DOCUMENTS

| 61-150286 | * | 7/1986 | (JP) . |
| 62-108586 | * | 5/1987 | (JP) . |
| 62-282957 | * | 12/1987 | (JP) . |
| 63-272568 | * | 11/1988 | (JP) . |
| 06-347925 | * | 12/1994 | (JP) . |
| 8-137028 | * | 5/1996 | (JP) . |

* cited by examiner

Primary Examiner—N. Le
Assistant Examiner—Hai C. Pham
(74) Attorney, Agent, or Firm—McDermott, Will & Will

(57) ABSTRACT

A method for measuring the quantity of light emitted from an optical write head which drives an array of light shutter elements extending in a main scanning direction individually in accordance with image data. In order to measure the quantity of light outputted from each of the light shutter elements, a photosensor is moved in the main scanning direction at a constant speed while the light shutter elements are driven in such a way that adjacent elements are not driven at a time. While light shutter elements which are in odd numbers in the array are driven, the photosensor is moved forward to measure the quantities of light outputted therefrom, and while light shutter elements which are in even numbers in the array are driven, the photosensor is moved backward to measure the quantities of light outputted therefrom. The optical write head is employed in a printer together with a light-quantity measuring unit for the optical write head, so that light-quantity measurement and production of light-quantity correction data are possible at real time.

48 Claims, 28 Drawing Sheets

F I G. 10
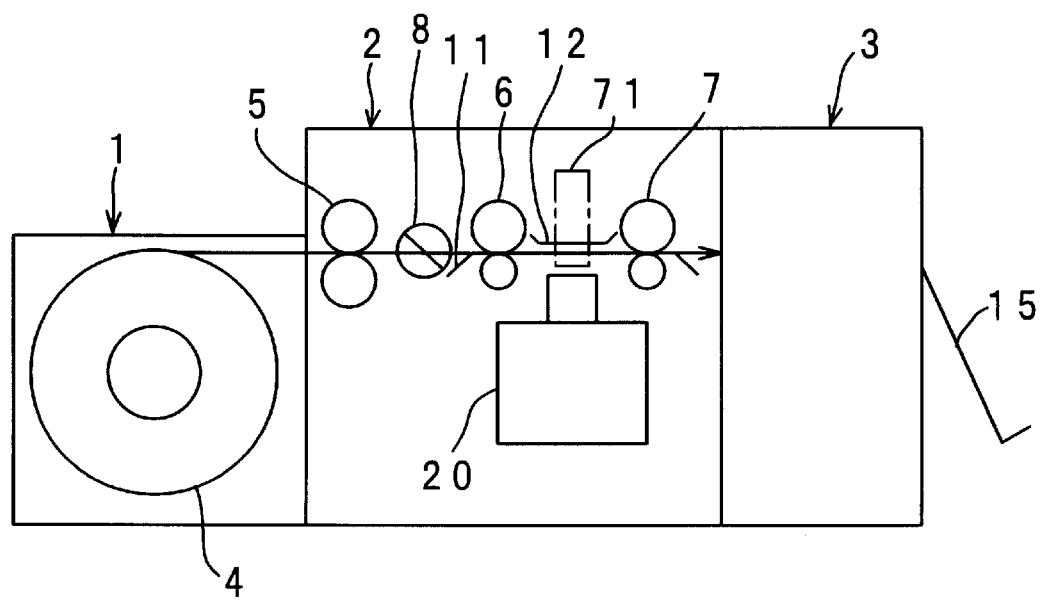

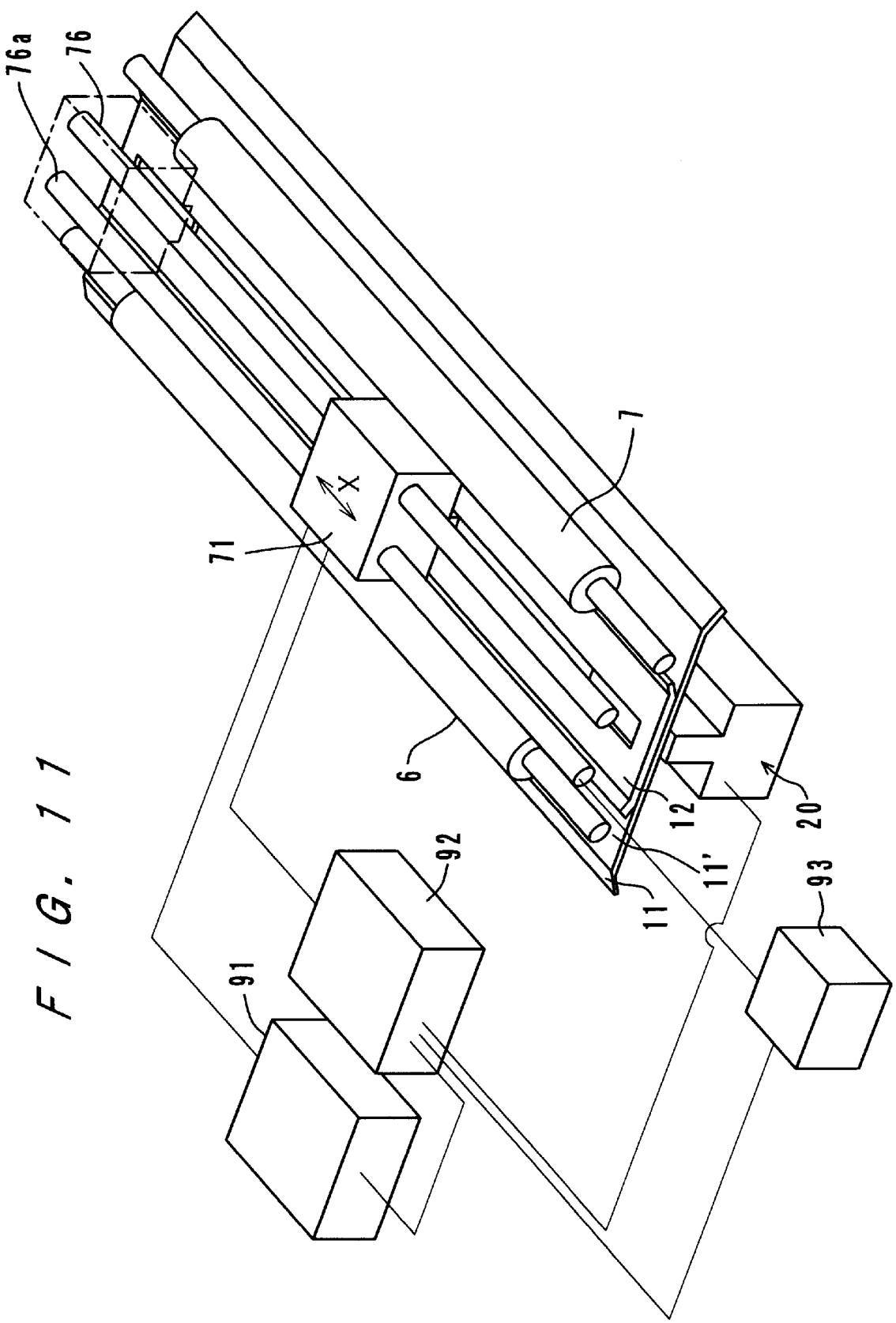

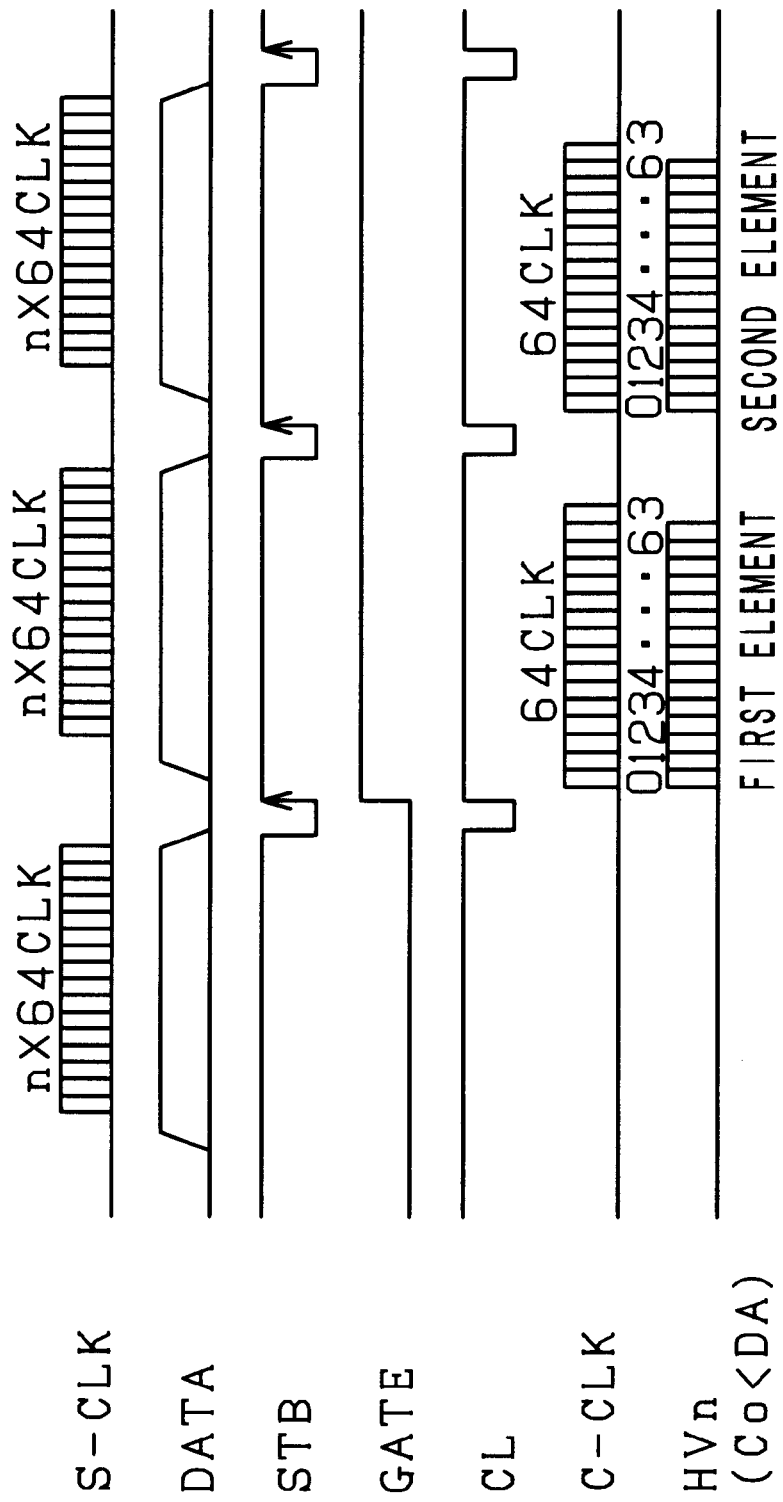

F I G. 22
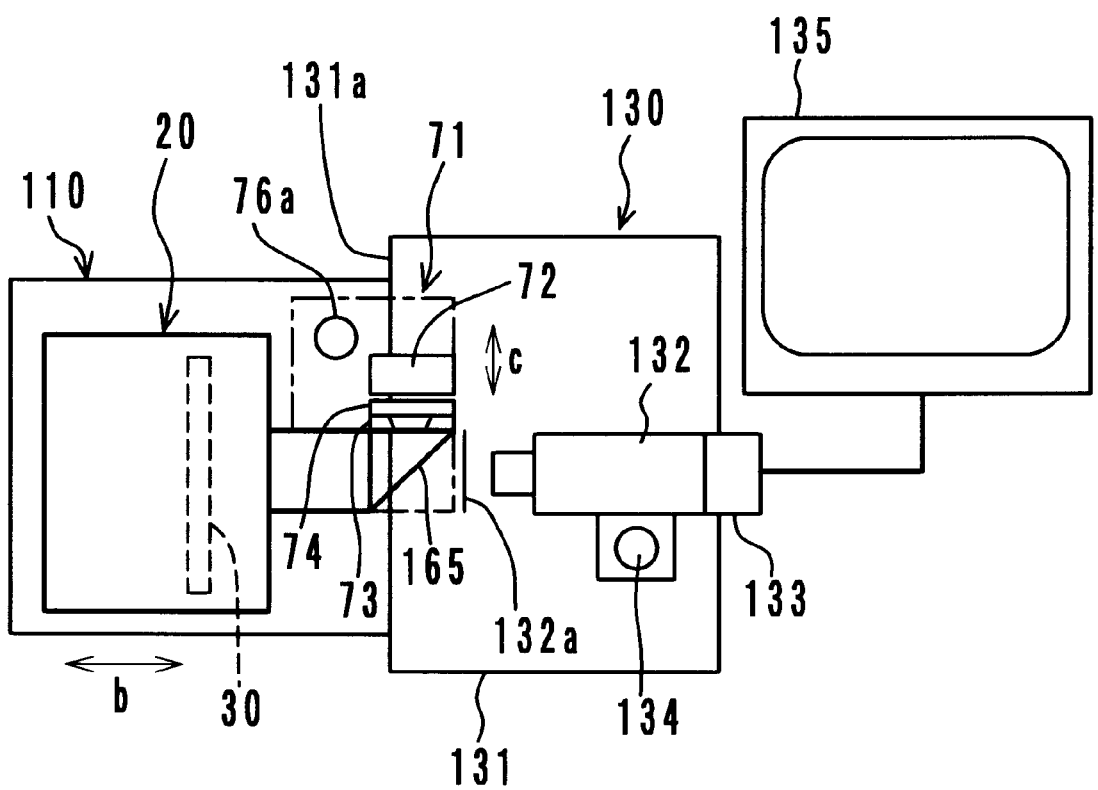

METHOD FOR MEASURING THE QUANTITY OF LIGHT EMERGENT FROM AN OPTICAL TIP ARRAY AND IMAGE FORMING APPARATUS PROVIDED WITH AN OPTICAL TIP ARRAY

BACKGROUND OF THE INVENTION

1. Field of the Invention

The present invention relates to a method for measuring the quantity of light emergent from a light shutter array made of PLZT or emitted from an LED array and an image forming apparatus which forms an image (electrostatic latent image) on a recording medium with such an optical tip array.

2. Description of Related Art

Conventionally, various kinds of optical write heads which turn on and off light for each pixel with use of a light shutter array made of PLZT or an LED array have been used to form images (electrostatic latent images) on a silver-salt print sheet or film or an electrophotographic photosensitive member. For formation of images without unevenness, such an optical write head needs to be subjected to measurement of the quantity of light outputted from each element and to correction in quantity of light according to the measurement result.

Japanese Patent Laid Open Publication No. 61-150286 has disclosed a method of measuring the quantity of light outputted from each element. According to this publication, while LEDs are turned on one by one in order in a main scanning direction, a light-quantity sensor which faces the LEDs at a specified distance therefrom is moved in the main scanning direction. In such a one-by-one lighting method, it is necessary to synchronize the turning-on/off of the LEDs with the movement of the sensor accurately, and minute control of the start position of the sensor is necessary. Accordingly, an encoder and an accurate shifting mechanism need to be provided. Also, from the result of measurement in this method, influence of light leaking from adjacent elements cannot be recognized, and in forming a thick image, a problem of unevenness is left unsolved.

Further, for formation of a multi-tone image, it is necessary to measure the output light-quantity characteristic of each element accurately. It is insufficient to measure the quantity of light outputted from each element only when it is on as disclosed by the method of Japanese Patent Laid Open Publication No. 61-150286.

Also, conventionally, an optical write head is fitted in a jig before it is employed in an image forming apparatus, and the quantity of light outputted from each element is measured with a light-quantity measuring device comprising a photo-sensor. Then, correction data are produced based on the results of the measurement. However, these correction data are effective only in the early time of the optical write head and are not useful when the output characteristic of each light element changes because of aging and/or a change in environmental conditions.

Meanwhile, Japanese Patent Laid Open Publication No. 6-347925 has suggested an image forming apparatus which is provided with three optical write heads so as to form an image at a high speed. For this type of apparatus, it is more important to measure the quantity of light outputted from each element and carry out correction at real time. However, this is left unachieved.

SUMMARY OF THE INVENTION

It is an object of the present invention to provide a method of measuring the quantity of light outputted from each element of an optical write head accurately in simple control and an optical write head which is subjected to measurement in this method.

It is another object of the present invention to provide a method of measuring the quantity of light outputted from each element of an optical write head accurately enough such that the optical write head can be used for formation of multi-tone images.

Another object of the present invention is to provide a full-color optical write head which is subjected to accurate measurement of the quantity of light of each color outputted therefrom in simple control.

Another object of the present invention is to provide an image forming apparatus wherein an optical write head employed therein can be subjected to measurement of the quantity of light outputted from each element without being detached from the apparatus so that the apparatus can produce light-quantity correction data at real time.

Further, another object of the present invention is to provide an image forming apparatus wherein a light-quantity sensor for measuring the quantity of light outputted from each element of an optical write head to make light-quantity correction data is also used to monitor the quantity of light outputted from the optical write head during actual image formation.

Furthermore, another object of the present invention is to provide an image forming apparatus which can measure the quantity of light outputted from each of a plurality of optical write heads employed therein with a simple mechanism and produce light-quantity correction data at real time so as to form quality images at all times.

In order to attain the objects above, according to the present invention, an optical write head which drives an array of optical elements extending in a main scanning direction individually in accordance with image data comprises control means which commands thin-out driving of the optical elements wherein adjacent elements are not driven at a time. In order to measure the quantity of light outputted from each of the optical elements, a light-quantity sensor with a light-receiving slit is moved in the main scanning direction with the light-receiving slit facing the array of optical elements while the optical elements are thin-out driven. Then, the quantity of light outputted from each of the optical elements is calculated from the output of the light-quantity sensor.

According to the present invention, because light-quantity measurement is carried out during thin-out driving of the optical elements, addressing of the optical elements and light-quantity measurement can be carried out merely by moving the light-quantity sensor at a constant speed. It is not necessary to synchronize the drive of the optical elements with the movement of the sensor, and the control is simple. Also, since adjacent optical elements are not driven at a time, by measuring the quantity of light outputted from an undriven element, the quantity of light leaking from an adjacent driven element and entering thereto can be recognized. Thus, the quantity of light actually outputted from each element can be calculated accurately, which is effective to solve the problem of density unevenness in forming a thick image.

If each optical element is driven at a specified frequency and a specified duty for the measurement so that a plurality of samplings from each element can be carried out, the address of each element can be recognized from the maximum value, and the maximum value is determined as the quantity of light outputted from the element. In this way, during one scan, the addresses of the optical elements can be recognized, and the quantities of light outputted therefrom can be measured accurately.

Further, toward a full-color type optical write head which drives optical elements individually while switching the light color at a high speed, the light-quantity measurement with respect each color is carried out while the optical elements is thin-out driven under conditions (duty, voltage, current, etc.) suitable for the light color. Thereby, accurate measurement can be carried out. In this case, the light color is switched at a lower speed during the light-quantity measurement than the speed during actual image formation so that the light of each color can be turned on and off a plurality of times while the light-quantity sensor is detecting the quantity of light outputted from each of the optical elements. Thereby, during one scan, the quantities of light of each color at different levels outputted from each element can be measured, and the output light-quantity characteristic of each element can be measured more accurately, which is effective for formation of multi-tone images.

Further, the present invention relates to a method of measuring the quantity of light emitted from an optical write device which drives an array of optical elements individually in accordance with image data, and the method comprises the steps of: addressing each of the optical elements based on the output of a photosensor which is moved in the main scanning direction during thin-out driving of at least one optical element wherein optical elements adjacent thereto are not driven simultaneously with the drive of the optical element; measuring the quantity of light outputted from each of the optical elements by moving the photosensor in the main scanning direction during all driving of optical elements wherein a plurality of serial optical elements are driven at a time under a specified condition; and determining the quantity of light outputted from each of the optical elements based on the addresses of the optical elements which have been recognized from the output of the photosensor during the thin-out driving and measured values during the all driving.

According to the method, the addresses of the optical elements can be recognized from the output of the photosensor during the thin-out driving of the optical elements. For example, if the photosensor is operated during driving of every other optical element (optical elements which are on odd numbers in the array or optical elements which are on even numbers in the array), peaks of the output waveform of the photosensor indicate the addresses of the driven elements, and the addresses of the undriven elements can be figured out by uniformly dividing the intervals among peaks. Also, if the arrangement of the optical elements is inputted accurately into the control section beforehand, the addresses of all the optical elements can be recognized based on the peak of the output waveform of the photosensor during thin-out driving of at least one element. Further, according to the present invention, in addition to addressing the optical elements based on the output waveform during the thin-out driving of the optical elements, the photosensor is operated during all driving of the optical elements, and the quantity of light outputted from each of the optical elements is determined based on the output waveform during the all driving in consideration of the addresses of the optical elements.

An image forming apparatus according to the present invention comprises: an optical write head which drives an array of optical elements extending in a main scanning direction individually in accordance with image data; transporting means which transports a recording medium in a sub scanning direction on a focal position of light emergent from the optical write head; a photosensor which receives the light emergent from the optical write head; and moving means which moves the photosensor in the main scanning direction.

In the image forming apparatus, while the photosensor is moving in the main scanning direction, the quantity of light outputted from each optical element of the optical write head is detected by the photosensor, and simultaneously, light-quantity correction data are produced. Then, at a time of image formation, the light-quantity correction data are used. Thus, since a light-quantity measuring device is employed in the apparatus, it is possible to carry out light-quantity measurement and renew light-quantity correction data periodically or at any time, and it becomes possible to carry out light-quantity correction which copes with a change in output characteristic of each optical element because of aging and/or a change in environmental conditions.

If the optical write head, a guide member of the recording medium, the photosensor and the moving means are assembled into a unit, it is possible to subject the unit to adjustment of the position of the optical write head and to light-quantity measurement before fitting the unit in the apparatus. Thereby, the productivity is improved, and with a simple positioning mechanism, the unit can be fitted in the apparatus accurately.

In an image forming apparatus provided with a plurality of optical write heads, preferably, a number of photosensors same as the number of the optical write heads are provided, and these photosensors and moving means are employed in the apparatus as a unit. While the unit is moved in the main scanning direction, the quantities of light emergent from the optical write heads are measured, and light-quantity correction data are produced. Then, at the time of image formation, the data are used.

BRIEF DESCRIPTION OF THE DRAWINGS

These and other objects and features of the present invention are apparent from the following description with reference to the accompanying drawings, in which:

FIG. 10 is a schematic view of a color printer provided with the optical write head;

FIG. 11 is a perspective view of a light-measuring unit provided in the color printer;

FIG. 14 is a timing chart showing the operation of the driver IC of FIG. 13;

FIG. 22 is a schematic view of a light-quantity measuring device for measuring the quantity of light emergent from an optical write head which is to be employed in the color printer of FIG. 20;

DETAILED DESCRIPTION OF THE PREFERRED EMBODIMENTS

Some exemplary methods of measuring the quantity of light emitted from an optical write head and exemplary image forming apparatuses according to the present invention are described with reference to the accompanying drawings.

First Embodiment

Optical Write Head

Figure 1:
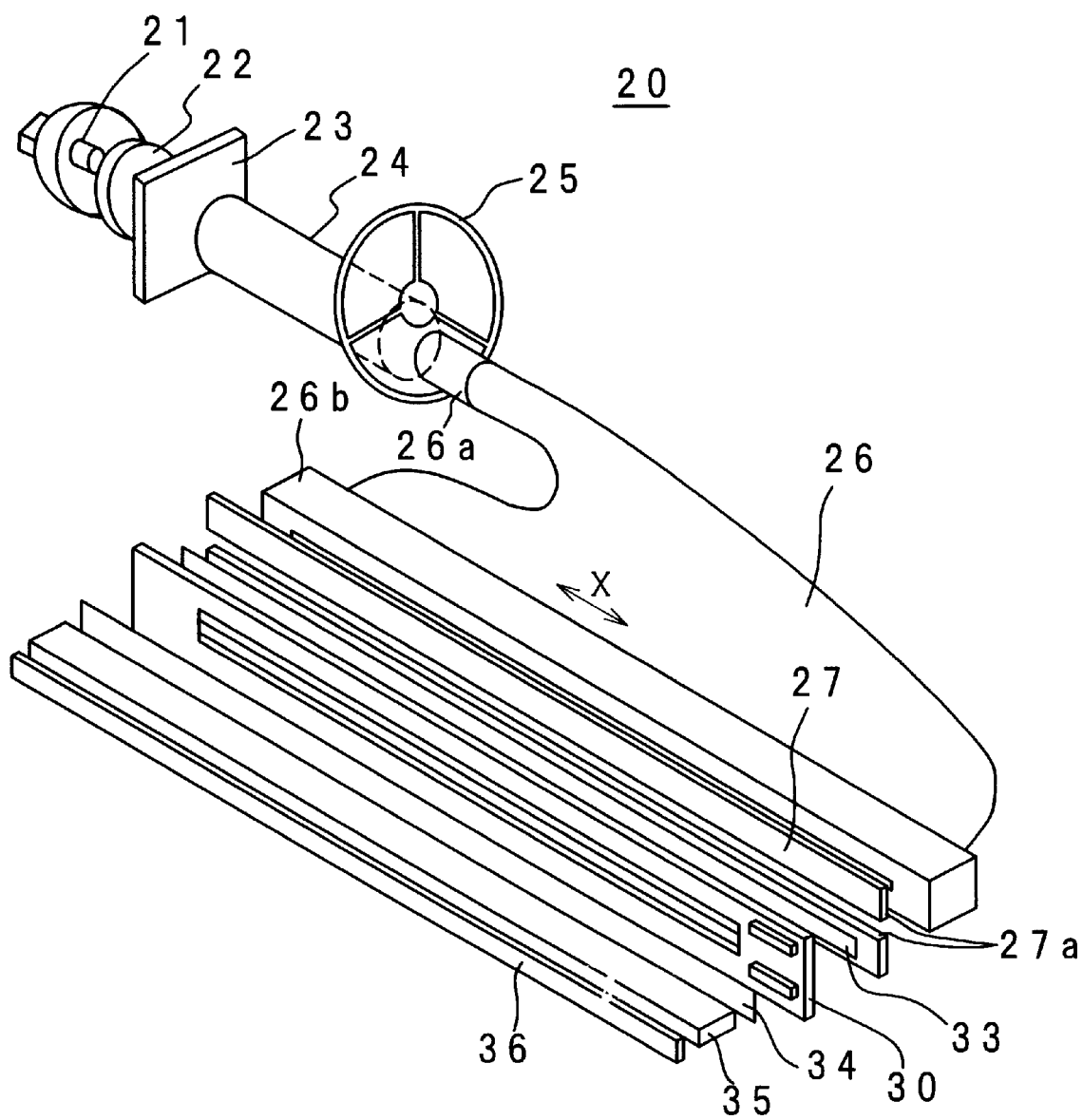
FIG. 1 is a perspective view of an optical write head to which the light-quantity measuring method of the first embodiment of the present invention is applied.

FIG. 1 shows an optical write head 20 which is used to write full-color images on a silver-salt print sheet. This optical write head 20 mainly comprises a halogen lamp 21, a heat insulating filter 22, a color correction filter 23, a light dispersing cylinder 24, an RGB filter 25, an optical fiber array 26, a slit plate 27, a light shutter module 30, an imaging lens array 35 and a dust protective glass 36.

The heat insulating filter 22 cuts the infrared component of light emitted from the halogen lamp 21, and the color correction filter 23 controls the light in quality so that the light will match the spectral sensitivity characteristic of the print sheet. The light dispersing cylinder 24 is to improve the efficiency of use of light and to suppress the unevenness in quantity of light. The RGB filter 25 is driven to rotate in synchronization with image writing by the light shutter module 30, which will be described later, and transmits different colors line by line.

The optical fiber array 26 is composed of a large number of optical fibers. The optical fibers are bundled at one end 26a, and the end 26a faces the dispersing cylinder 24 with the RGB filter 25 in-between. The optical fibers are aligned to extend in a main scanning direction indicated by arrow X at the other end 26b, so that light is emergent from the optical fiber array 26 linearly. The slit plate 27 has mirror surfaces 27a so as to guide the light emergent from the optical fiber array 26 to the light shutter module 30 efficiently. Further, a heater (not shown) is provided to the slit plate 27. The heater is to maintain the temperature of PLZT shutter tips of the light shutter module 30, and the temperature control is carried out in accordance with a detection result of a thermometer (not shown) provided to the module 30.

The light shutter module 30 has an array of PLZT light shutter tips, each of which has shutter elements, on a slit of a ceramic substrate or on a glass substrate. Further, an array of driver ICs are provided in parallel to the array of PLZT light shutter tips. The light shutter elements are driven by the driver ICs in such a way that only specified pixels will be printed. Also, a polarizer 33 and an analyzer 34 are provided before and after the module 30, respectively. As is well known, PLZT is a ceramic which has an electrooptic effect at a large Kerr constant and is light-transmitting. The light is linearly polarized by the polarizer 33, and the polarization plane of the light rotates in accordance with turning-on and turning-off of electric fields caused by supplies of voltages to the light shutter elements. Consequently, the light emergent from the analyzer 34 is turned on and off part by part.

The light emergent from the analyzer 34 is focused on the print sheet via the imaging lens array 35 and the dust protective glass 36, and thus, a latent image is formed on the print sheet. The print sheet is transported in a direction (sub scanning direction) perpendicular to the main scanning direction X at a constant speed.

Light-Quantity Measuring Device and Measuring Method

Figure 2:
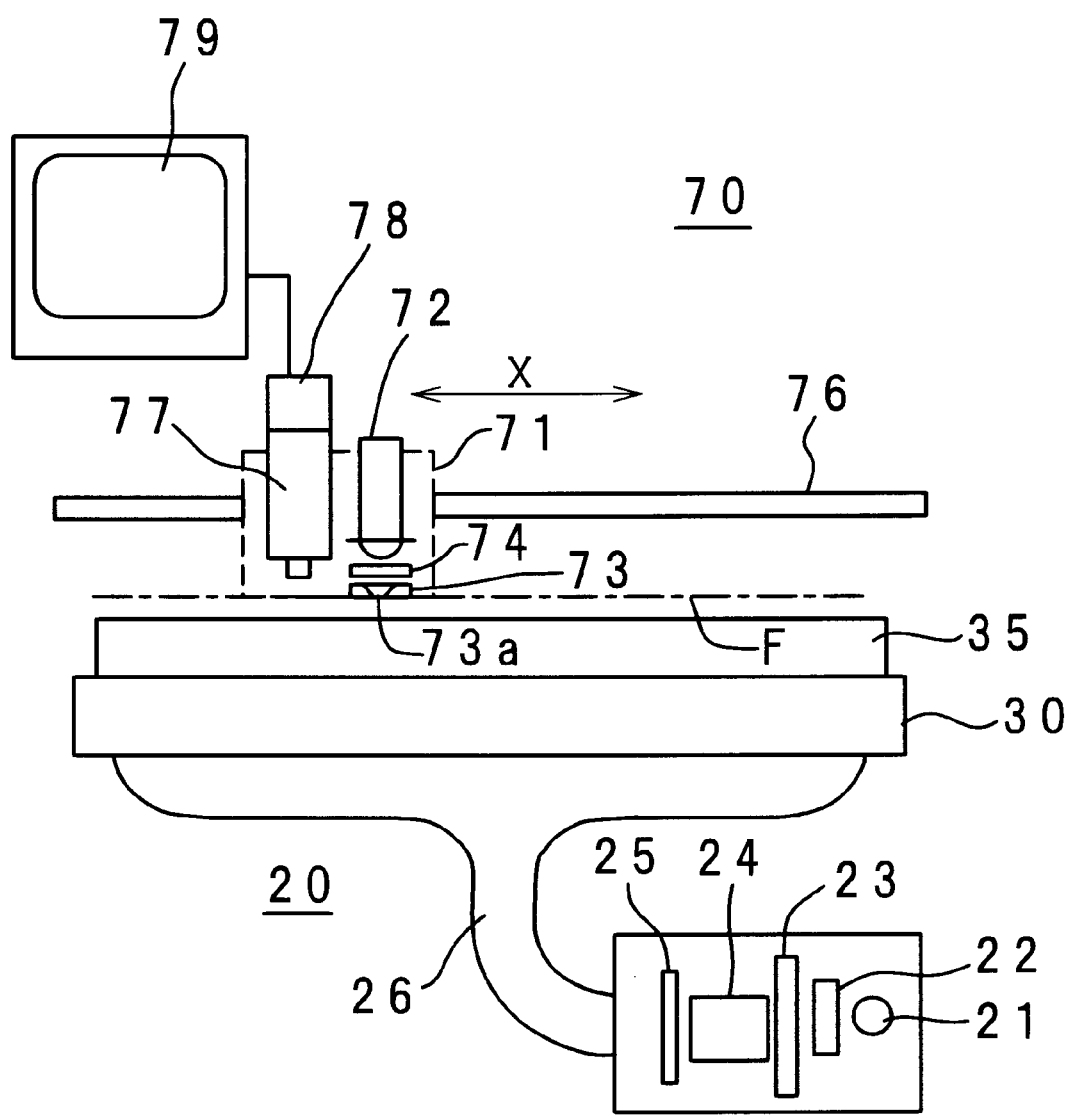
FIG. 2 is a schematic view of a light-quantity measuring device.

FIG. 2 shows a measuring device 70 which measures the quantity of light outputted from each light shutter element of the optical write head 20.

In the measuring device 70, a measuring unit 71 which has a photoelectric conversion sensor 72 and a tool maker's microscope 77 is fitted to guide shafts 76 to be slidable thereon. The guide shafts 76 extend in parallel to the main scanning direction X of the light shutter module 30, and the measuring unit 71 reciprocates in the direction X at a constant speed while the sensor 72 is right above the light shutter array. Referring to FIG. 11, one of the guide shafts (76a) has a male screw on its circumference, and a nut (not shown) provided in the measuring unit 71 engages with the male screw. Accordingly, the measuring unit 71 moves reciprocally following the forward/reverse rotation of the guide shaft 76a.

By the light incidence side of the sensor 72, a slit plate 73 and a light dispersing plate 74 are provided. The slit plate 73 has a slit 73a with a width which is 25% to 400% (preferably 50% to 200%) of the width of a pixel and is located on a focal plane F of the imaging lens array 35 of the optical write head 20. The sensor 72 has a spectral sensitive characteristic substantially equal to or larger than that of the print sheet.

The tool maker's microscope 77 is integrated with a CCD camera 78. Each of the light shutter elements is photographed by the CCD camera 78 via the microscope 77 and displayed on a monitor display 79. The person in charge of this measurement adjusts the position of the optical write head 20 minutely so that the light shutter elements at both ends of the light shutter array will be positioned correctly while watching the screen of the monitor display 79. The optical write head 20 is so mounted on a table (not shown) that the height and the inclination with respect to the sensor 72 and the distance from the sensor 72 are adjustable.

The light-quantity measuring device 70 and the optical write head 20 are controlled by a sequencer so that the reciprocal movement of the measuring unit 71 can be timed to measurement of the quantity of light outputted from each light shutter element. The optical write head 20 is driven in a mode (driving frequency, duty, on/off data) which has been programmed beforehand. The measuring device 70 integrates measured values with respect to each light shutter element in synchronization with the programmed drive. Usually, in consideration of the relationship between the driving frequency of the optical write head 20 and the driving speed of the sensor 72, ten and several times of samplings/holds from each light shutter element are carried out. The output of the sensor 72 is subjected to A/D conversion and is transmitted to a control section for necessary processing.

The driving mode of the optical write head 20 for the measurement is determined in accordance with driving conditions of an apparatus which the optical write head is to be employed in. Here, a case wherein the optical write head 20 has a printing density of 400 dpi and is to be employed in a printer which is driven at a frequency of 1 kHz, that is, which has a system speed of 63.5 mm/s is described.

First, while light shutter elements which are in odd numbers in the light shutter array are driven (turned on and off repeatedly), the sensor 72 is moved forward from an initial position which is outside a scanning area. The outputs of the sensor 72 during an on-period (1 msec) are integrated, and the integrated value is sampled/held and subjected to A/D conversion and is sent to the control section. If the sensor 72 is moved at a speed of 1 mm/s, since the printing density of the optical write head 20 is 400 dpi (63.5 $\mu$m), 63.5 times of samplings/holds from each light shutter element are carried out. After moving the sensor 72 by a distance a little longer than the main scanning length, data sending to the control section is stopped, and the sensor 72 is returned to the initial position. Next, while light shutter elements which are in even numbers in the light shutter array are driven (turned on and off repeatedly), the light-quantity measurement and data input are carried out in the above-described manner. In this way, all the light shutter elements are subjected to the light-quantity measurement. It is possible to carry out the light quantity measurement of the light shutter elements which are in even numbers during the return movement of the sensor 72, and rather, this is more efficient.

An effective measuring way for light-quantity correction is to collect values from each light shutter element in four different conditions. The optical write head 20 is driven at different duties (high, middle, low and off). In this case, approximately 16 times of samplings/holds from each light shutter element in each condition of the four levels are carried out during one scan (a one-way movement of the sensor 72). It is possible to carry out the four-level light-quantity measurement during two to four scans. Also, the number of levels of the duty is not necessarily to be four.

The number of samplings/holds from each light shutter element can be increased by lowering the speed of the sensor 72 or by heightening the driving frequency of the optical write head 20. It cannot be said that there is no change in quantity of light outputted from each light shutter element with a change in driving frequency of the optical write head 20. However, the change is small enough to be allowable. If the correlation between the driving frequency and the quantity of light is made clear beforehand, the change in quantity of light with a change in driving frequency can be handled by using a correction coefficient.

If the optical write head 20 is a type which can write full-color images, such measurement must be carried out with respect to each light color (R, G and B). Accordingly, in this case, the above-described measuring process is repeated three times while the light color is switched by the RGB filter 25.

In the control section, with respect to each light shutter element, the maximum value and the minimum value are found out from the inputted data, and the address of the element is figured out from these values. Then, with respect to each light shutter element, measured quantities of light at the four levels are expressed by approximate cubic curves, and correction coefficients at respective levels (for example, 0 through 255 tone levels) are determined.

Figure 3:
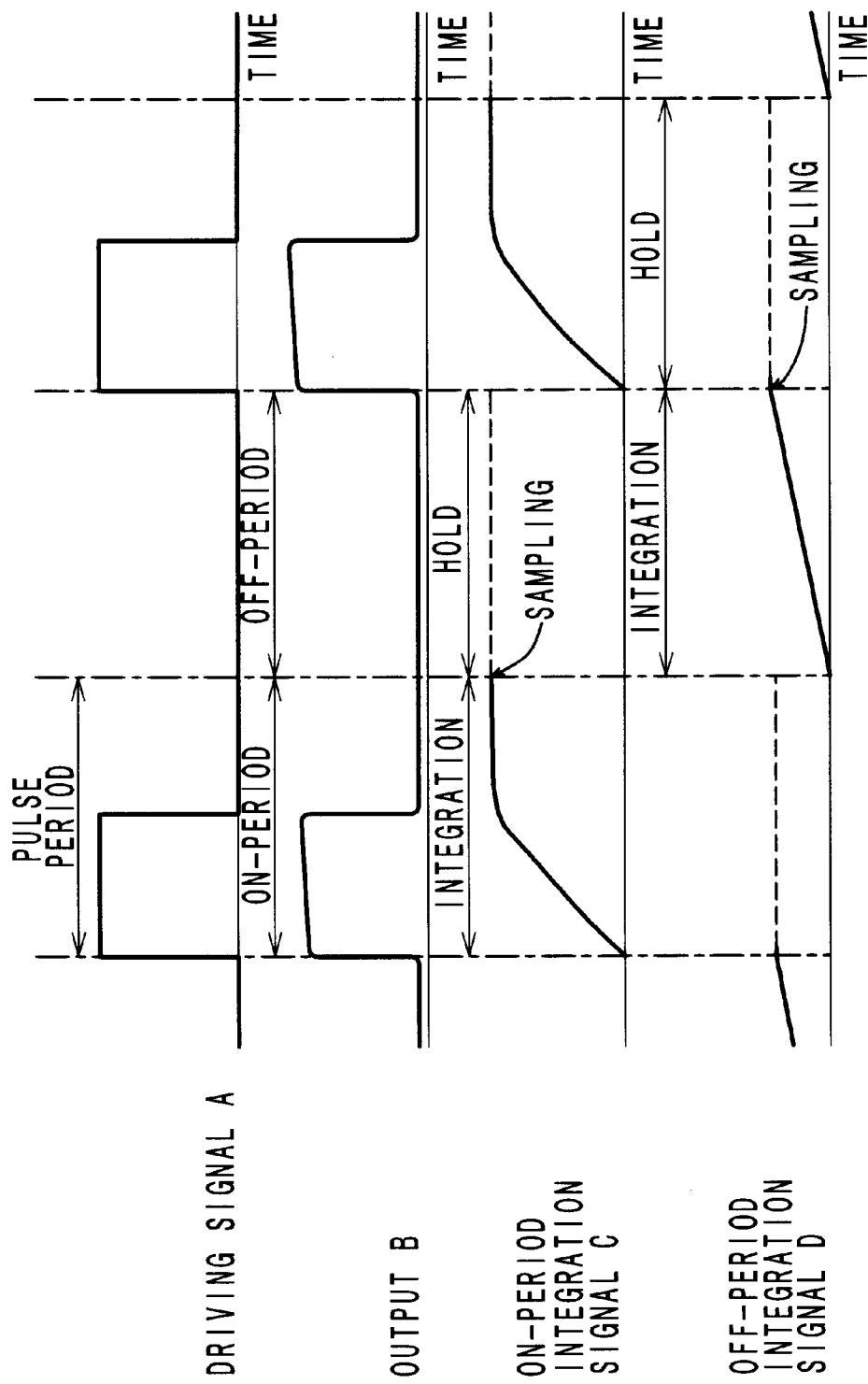
FIG. 3 is a chart showing waveforms of analog signals during light-quantity measurement.
Figure 4:
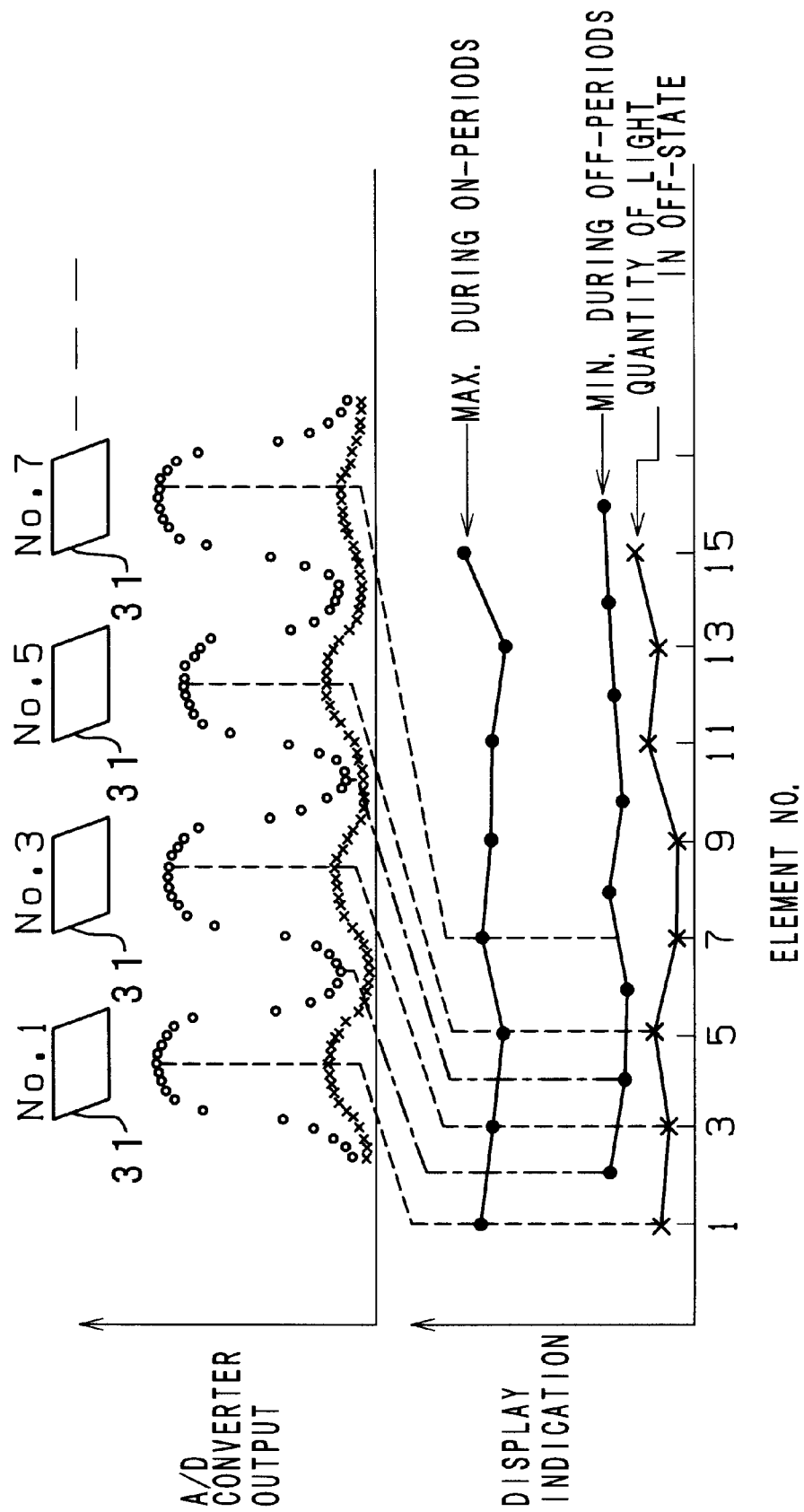
FIG. 4 is a chart showing waveforms of digital signals during the light-quantity measurement.

Next, referring to FIGS. 3 and 4, the principle of the light-quantity measurement is described.

First, a driving signal A is applied to light shutter elements which are in odd numbers in the light shutter array. The driving signal A has a frequency and a duty which are equal or nearly equal to the driving conditions of an apparatus which the optical write head 20 is to be employed in. Each light shutter element makes an output B, and the sensor 72 which is moving forward in the main scanning direction X outputs a waveform indicating the output B. Values detected by the sensor 72 during an on-period is integrated, and after the on-period, the integrated value is sampled/held and subjected to A/D conversion.

In the measurement, since the slit 73a which has a width substantially equal to the width of each light shutter element is moved in the main scanning direction X at such a speed as to carry out a plurality of samplings from each light shutter element, the output after the A/D conversion is as shown in FIG. 4. When the sensor 72 comes to a position exactly opposite a driven light shutter element 31, the sensor 72 detects the maximum quantity of light, and when the sensor 72 comes to a position between adjacent driven light shutter elements 31, the sensor 72 detects the minimum quantity of light. Accordingly, from the position of a peak of the output waveform of the sensor 72, the address of a driven light shutter element can be recognized. The minimum quantity of light detected between the driven light shutter elements 31 depends on the MTF of the imaging lens, the width of the slit 73a, etc. Although the position of an undriven light shutter element can be recognized from the position of a through of the output waveform of the sensor 72, it is possible to take an exact midpoint between adjacent peaks as the address of an undriven light shutter element.

Next, while the driving signal A is applied to light shutter elements which are in even numbers in the light shutter array, the sensor 72 is moved backward to detect the quantities of light outputted from the light shutter elements. By superimposing the results with respect to the light shutter elements which are in even numbers on the results with respect to the light shutter elements which are in odd numbers, the output light-quantity characteristics of all the light shutter elements can be recognized.

In the above-described measurement, since the positions of the light shutter elements are found out based on the output of the sensor 72, it is not necessary to monitor the position of the sensor 72 by use of an encoder and a detector for the initial position of the sensor 72. In this embodiment, the driving signal A is to drive each light shutter element to come to an on-state and an off-state alternately, and the sensor 72 detects the quantities of light both in periods of the on-state and in periods of the off-state.

The quantity of light in an off-period (the quantity of leakage light which means the quantity of light leaking from the halogen lamp 21) is measured in the same manner as that in an on-period. Specifically, values detected by the sensor 72 during the off-period is integrated, and after the off-period, the integrated value is sampled/held and subjected to A/D conversion. It is possible to find out the address of a light shutter element based on the outputs of the sensor 72 during the off-periods. However, because the outputs of the sensor 72 during the off-periods are small, the address of a light shutter element is determined from the position of the maximum output of the sensor 72 during the on-periods of the light shutter element, and an output during an off-period adjacent to the on-period when the sensor 72 outputs the maximum value is taken as the quantity of light in its off-state. It is preferred to determine the minimum quantity of light during the on-periods by using the following expression:

quantity of light outputted from a light shutter element=maximum quantity of light measured from the element+(quantity of entering light−quantity of leakage light)×correction coefficient In the above expression, the quantity of entering light means the quantity of light leaking from adjacent elements.

The correction coefficient, which depends on the driving pattern of the light shutter elements and the width of the slit 73a, is within a range from 0.2 to 1.0. When line/dot images (sharp images) are to be formed, it is sufficient to carry out a light-quantity correction to each light shutter element only in accordance with the maximum quantity of light measured from the element. Further, in a case of reproducing one dot (a pixel), the light-quantity correction only in accordance with the maximum quantity of light is preferred.

Although a pattern of driving every other light shutter element is adopted in the above-described measuring method, various driving patterns are possible.

Figure 5:
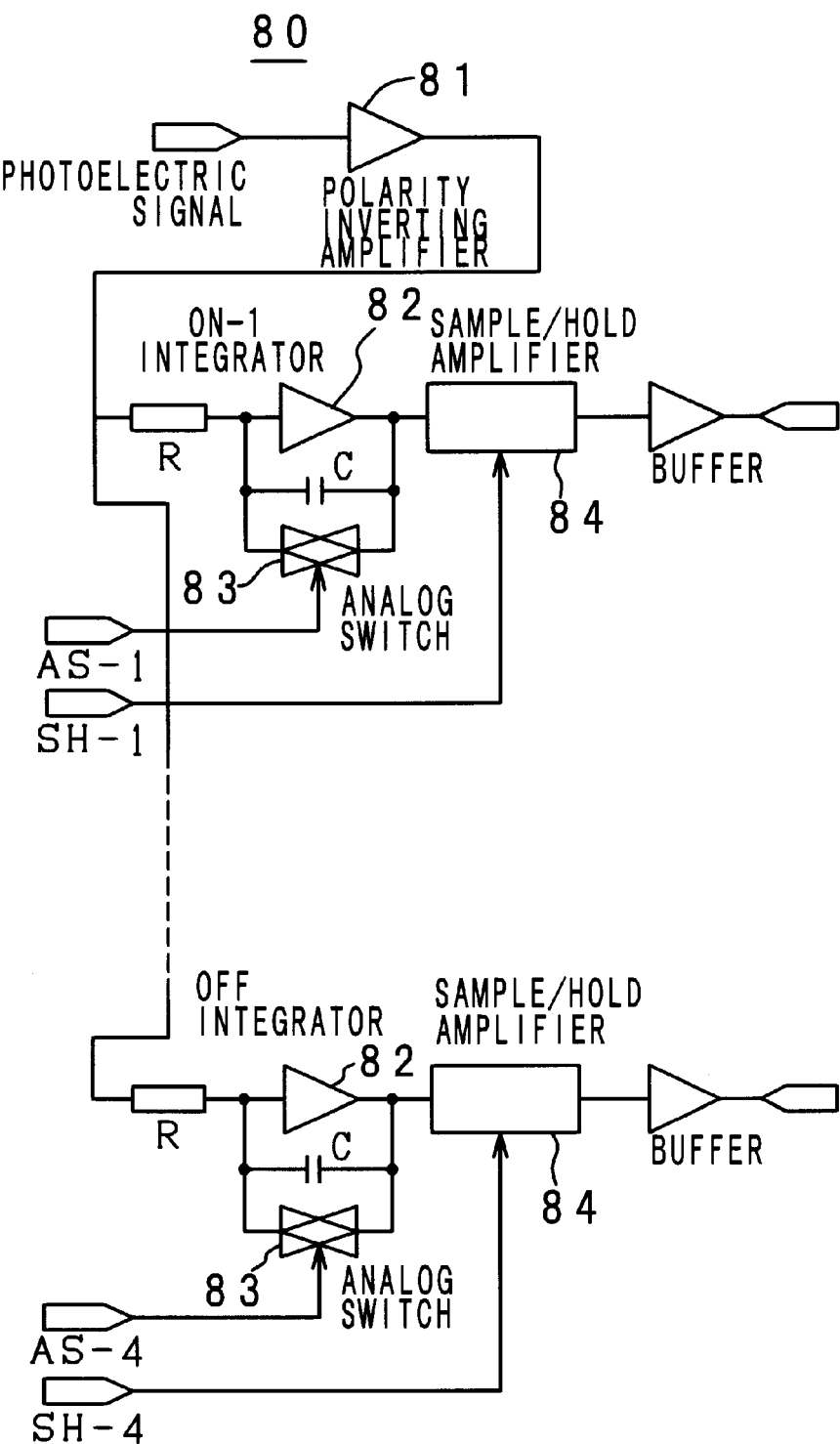
FIG. 5 is a block diagram of an integrating circuit for the light-quantity measurement.
Figure 6:
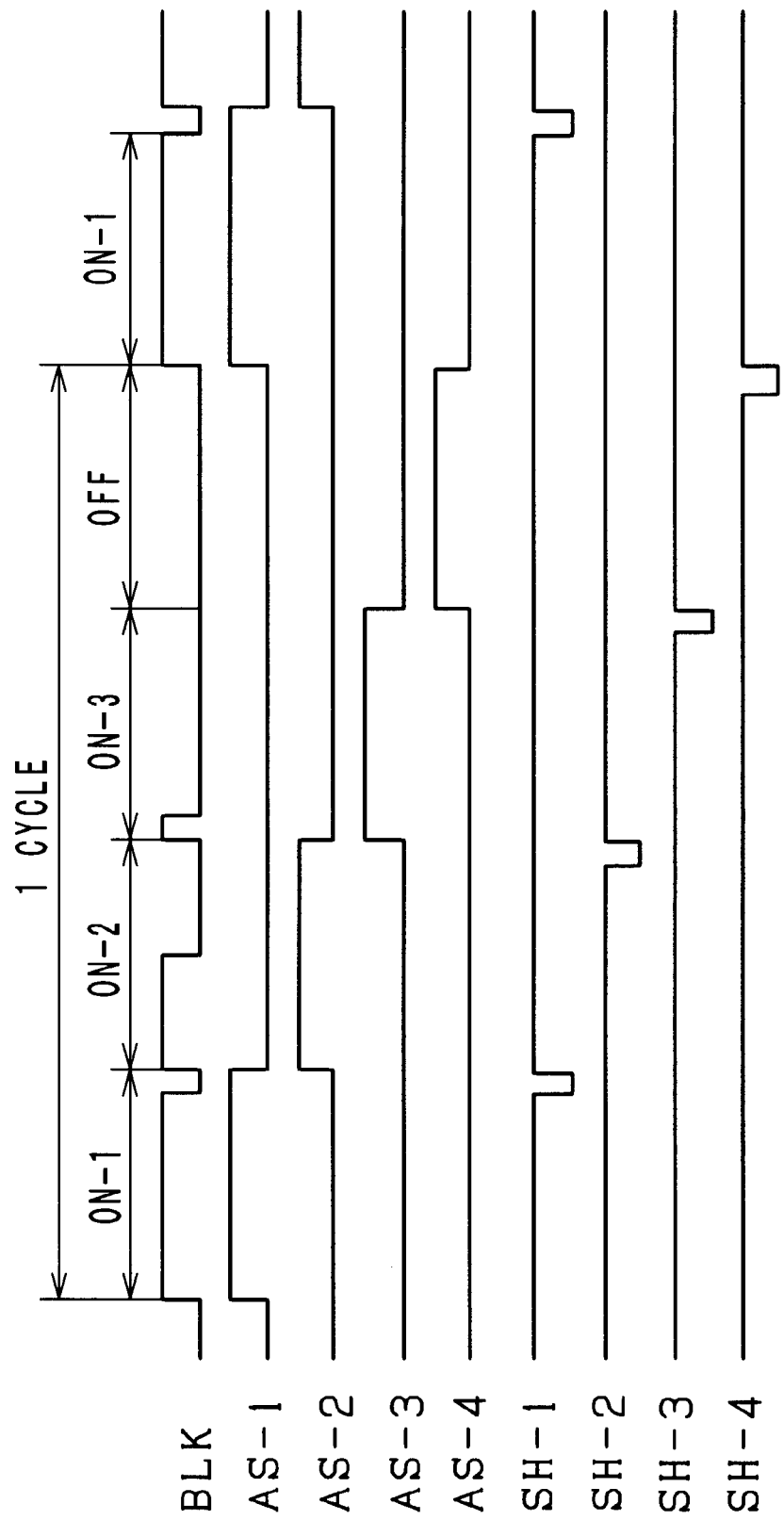
FIG. 6 is a timing chart showing the operation of the integrating circuit.

FIG. 5 shows an integrating circuit 80, and FIG. 6 shows a timing chart.

The integrating circuit 80 is to measure the quantities of light outputted from each light shutter element at different four levels, at a high duty, at a middle duty, at a low duty and at an off level, and the integrating circuit 80 is composed of four lines although FIG. 5 shows only two of the four. A photoelectric signal outputted from the sensor 72 is inputted to an integrator 82 in one of the four lines via a polarity inverting amplifier 81. Further, the signal is sent to a sample/hold amplifier 84 and is subjected to A/D conversion. The photoelectric signal is subjected to integration in the integrator 82 while an analog switch connected thereto is kept on in response to the corresponding one of signals AS-1 through AS-4. The integrated value is held in the sample/hold amplifier 84 when the corresponding one of signals SH-1 through SH-4 drops and is converted into a digital signal by an A/D converter (not shown).

With this integrating circuit 80, the quantities of light outputted from each light shutter element at four levels can be measured during one scan. From these measured values, approximate expressions to indicate the light quantity characteristics of the light shutter elements are calculated, and a light quantity correction table is made based on the expressions. Thus, a suitable light-quantity correction can be made to each light shutter element for formation of a quality multi-tone image.

Structure and Operation of the Driver ICs

Now, the driver ICs which drive the optical write head 20 and its operation for the light-quantity measurement by use of the light quantity measuring device 70 are described.

The thin-out driving of the light shutter elements for the light-quantity measurement can be realized by transmitting necessary data from the CPU to drive the optical write head 20. However, this function can be imparted to the driver ICs.

Figure 7:
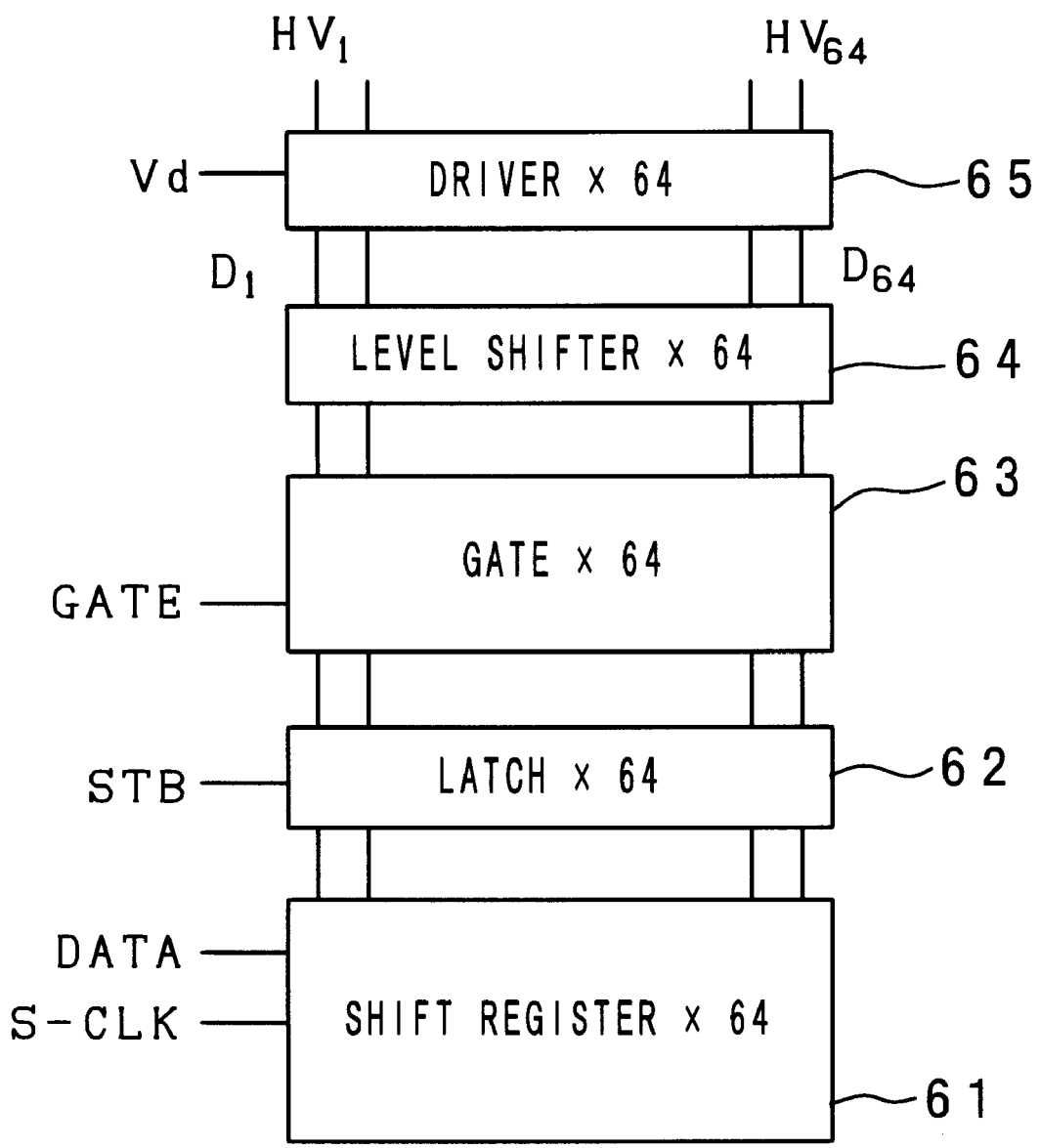
FIG. 7 is a block diagram of a driver IC for two-value image formation.

FIG. 7 shows the structure of a driver IC 60 which is a type for formation of two-value images. For practical use, a plurality of driver ICs 60 are connected to each other by a ladder chain to drive 1024 shutter elements. Each driver IC 60 is to drive 64 light shutter elements, and comprises a shift register 61, a latch circuit 62, a gate circuit 63, a level shift circuit 64 and a driver circuit 65.

Image data DATA(A) and DATA(B) are shifted into the shift register 61 based on a shift signal R/L in synchronization with a shift clock signal S-CLK and are latched in the latch circuit 62 controlled by a strobe signal STB. When a gate signal GATE is inputted to the gate circuit 63, signals $D_1$ through $D_{64}$ are sent to the driver circuit 65 via the level shift circuit 64. A driving voltage Vd is applied to the driver circuit 65, and the driver circuit 65 outputs $HV_1$ through $HV_{64}$ to the shutter elements. The pulse widths of $HV_1$ through $HV_{64}$ are set in accordance with the signals $D_1$ through $D_{64}$ sent from the level shift circuit 64.

In the driver IC 60, when the light-quantity measurement is commanded, a data signal DATA is sent to the shift register 61 in synchronization with the shift clock signal S-CLK and is latched in the latch circuit 62 controlled by the strobe signal STB. Then, by driving the gate signal GATE at a specified duty, the light shutter elements can be driven to output a specified quantity of light. The thin-out driving of the light shutter elements can be realized by dividing the shift clock signal S-CLK and by outputting the image data DATA associated with the divided shift clock signal by use of an AND gate. If the shift clock signal S-CLK is divided into two (the frequency is made a half), every other light shutter element can be driven. A repetitive signal is used for the thin-out driving, and by using a plurality of gate signals GATE with different duties, the above-described light-quantity measurement can be carried out without a printer controller. If the light shutter elements are arranged in two lines staggeringly, that is, in a line of odd numbers and a line of even numbers, at least a volume of image data DATA covering the light shutter elements in one line are set at "H" level, sent to the shift register 61 and latched in synchronization with the strobe signal STB. Thereafter, the above-described control is carried out. In this way, the drive of every other light shutter element can be realized more easily. Also, by providing a test input terminal to the gate circuit 63 to turn on the gate circuit forcibly and by sending a duty signal to the terminal, the light-quantity measurement can be carried out easily.

Figure 8:
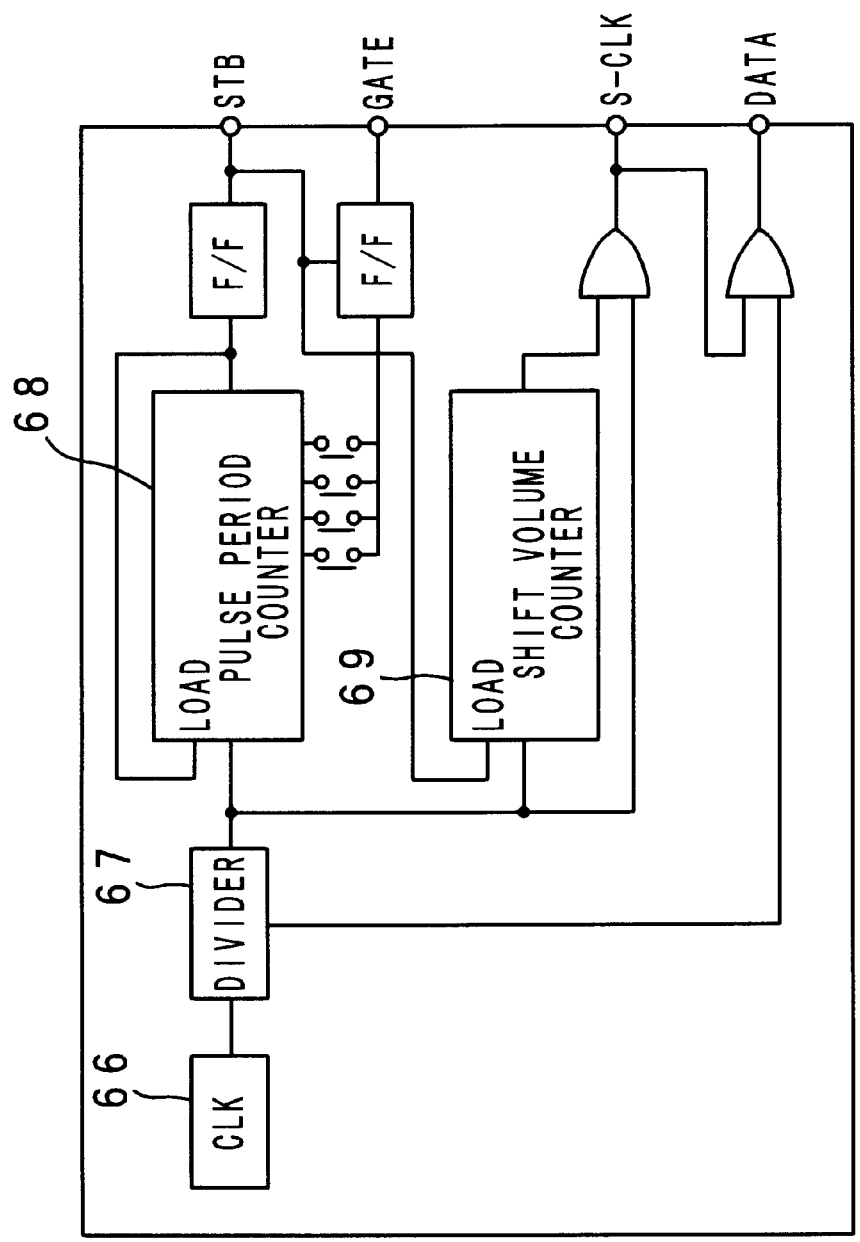
FIG. 8 is a block diagram of a circuit for producing signals transmitted to the driver IC of FIG. 7.
Figure 9:
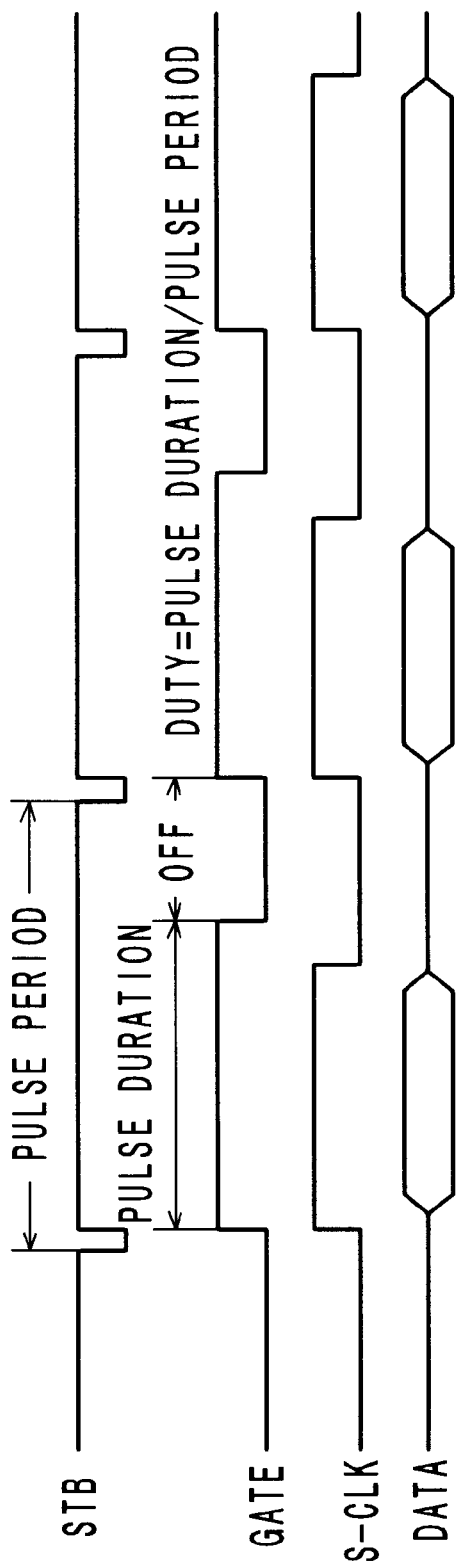
FIG. 9 is a timing chart showing the operation of the signal producing circuit of FIG. 8.

The operation of the driver ICs 60 for the light-quantity measurement is described in more detail referring to FIGS. 8 and 9. A basal clock signal CLK is divided by a divider 67 into a shift clock signal S-CLK and a counter signal. A pulse period counter 68 is to determine a pulse period and produces the strobe signal STB. When the counter 68 counts up a specified time, a one-shot multi-vibrator is driven to output the strobe signal STB, and at the same time, the counter 68 is reset. Thereby, the strobe signal STB is outputted periodically. By making the time to be counted by the counter 68 variable, the duty becomes variable. A shift volume counter 69 is to determine the volume of data to be transmitted to the shift register 61. While the counter 69 is counting, the counter 69 makes an output. The output from the counter 69 and the clock signal CLK are inputted to an and gate, and then, the shift clock signal S-CLK is outputted.

The data signal DATA can be made from the clock signal CLK into various patterns. A signal for a drive of every other light shutter element can be produced by using a signal into which the clock signal CLK is divided to have a half frequency. Other patterns can be made by use of a simple logic circuit. In the structure wherein light shutter elements are arranged in two lines staggeringly, in a line of odd numbers and in a line of even numbers, the shift volume counter 69 is not necessary, and the circuit is simpler. In this case, the data signal DATA is kept at the level of "H" at all times so that the shift clock signal S-CLK is outputted continuously.

Color Printer

FIG. 10 is a schematic view of a color photoprinter. The color printer comprises a print sheet containing station 1, an image forming station 2 and a processing station 3. A print sheet 4 is contained in the station 1 in the form of a roll. In the image forming station 2, the optical write head 20 shown by FIG. 1 and the measuring unit 71 shown in FIG. 2 (the microscope 77 and the CCD camera 78 are omitted) are provided. Further, in the station 2, pairs of transport rollers 5, 6 and 7, a cutter 8 and transport guide plates 11 and 12 which are used for handling of the print sheet 4 are provided.

The print sheet 4 is guided into the image forming station 2 through the transport rollers 5 with its photosensitive side facing down. When a specified length comes into the station 2, the rollers 5 are stopped, and the cutter 8 is driven to cut the print sheet 4. The cut piece of print sheet 4 is transported by the rollers 6 and 7 at a constant velocity. When the print sheet 4 passes over the optical write head 4, it is exposed to light coming through an opening made in the guide plate 11, whereby a latent image is formed on the print sheet 4. After the exposure, the print sheet 4 is subjected to development, fixation and drying in the processing station 3, and then, the print sheet 4 is discharged onto a tray 15.

The print sheet 4 is transported to the exposure position in such a way that writing of the optical write head 20 can start at a writing start point of the print sheet 4, and during the writing, the print sheet 4 is transported at a constant velocity. However, transportation of the print sheet 4 at the exposure position does not have to be continuous but may be intermittent at a pitch corresponding to the density in the sub scanning direction.

If the print sheet 4 is cut while the print sheet 4 is passing the exposure position, the coincidence between the start of writing of the optical write head 20 and the writing start point of the print sheet 4 may be damaged. In order to avoid this trouble, the print sheet 4 is cut while the sheet 4 is bent, or the exposure is started after a cut of the print sheet 4 although this necessitates a long print sheet transport path. When a roll of print sheet is used in the structure wherein a cut of the print sheet is carried out before exposure, in order to prevent the print sheet 4 from being exposed unnecessarily, the lamp 21 of the optical write head 20 is turned off, the output of the lamp 21 is reduced to such an extent as not to cause exposure of the print sheet 4, or the optical write head 20 is shut mechanically by use of a shutter.

As shown in FIG. 11, the measuring unit 71 is located opposite the optical write head 20 and is capable of reciprocate in the main scanning direction X with forward/backward rotation of the driving guide shaft 76a. The measuring unit 71 is controlled by a control section 91 and a sequencer 92. The guide shaft 76a is driven by a reversible motor 93. Prior to exposure of the print sheet 4, the measuring unit 71 measures the quantity of light outputted from each light shutter element of the optical write head 20 in the above-described manner. Then, the measuring unit 71 retreats from the print sheet transport path so as not to interfere the transportation of the print sheet 4 (see the alternate short and long dash line in FIG. 11). The measuring unit 71 is in the retreating position at all times other than the time of the light-quantity measurement.

Figure 12A:
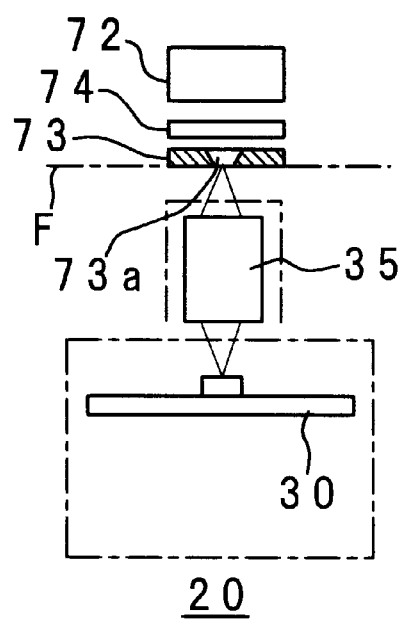
FIGS. 12a and 12b are illustrations showing the positional relationship between the optical write head and the light-quantity measuring unit.

The guide plate 11 is so located that its guide surface 11' is on the focal surface F (see FIG. 12a) of the optical write head 20, and a focal shift never occurs even when a print sheet with a different thickness is used. The pairs of transport rollers 6 and 7 are controlled by a pulse motor to rotate at a constant velocity, and thereby, the sub scanning speed is kept constant. An upper guide surface 12 is provided to prevent a float of the print sheet and is pressed onto the print sheet by its own weight or by a spring or the like.

The slit plate 73 of the measuring unit 71 is on the focal surface F of the optical write head 20, but as mentioned, the measuring unit 71 retreats from the print sheet transport path at all times other than the time of the light-quantity measurement.

During the light-quantity measurement, light emergent from the optical write head 20 is incident to the sensor 72 through openings made in the guide plates 11 and 12. If the whole body or the light passing portion of the guide plate 11 is made of a light transmitting material such as an acrylic material, the opening is not necessary. If the guide plates 11 and 12 have no openings, the guiding functions of the guide plates 11 and 12 are improved. With respect to the upper guide plate 12, it can be structured to retreat from the guiding position in the time of the light-quantity measurement, and in this case, the opening is not necessary.

Figure 12B:
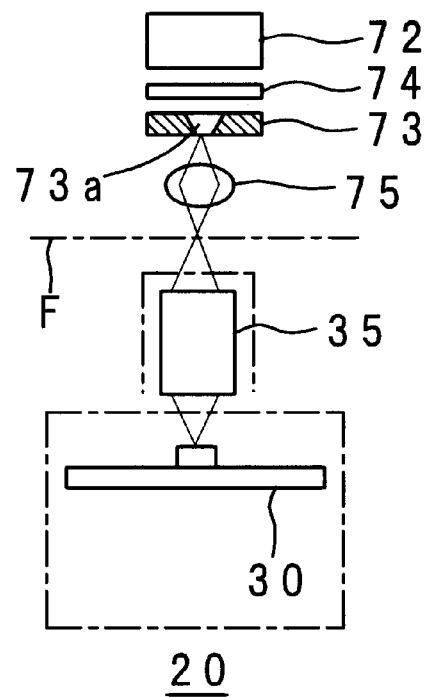

As shown in FIG. 12b, it is possible to provide a lens 75 between the imaging lens array 35 and the slit plate 73. With the lens 75, the measuring unit 71 can be located apart from the focal surface F, and it becomes no longer necessary to make the measuring unit 71 retreat from the print sheet transport path in the time of exposure, thereby reducing the size of the apparatus. In this case, the upper guide plate 12 must be made of a light transmitting material.

In this color printer, the RGB filter 25 of the optical write head 20 is rotated to switch the color of the light at a high speed, and line by line, images of R, B and G are written while the light shutter elements are turned on and off. This printer is usually powered on by a timer to carry out temperature control of the developer, etc. In this warm-up operation, the light-quantity measurement and the light-quantity correction (calibration) are carried out. The calibration, as described above, is a process to make correction to the light shutter elements of the optical write head 20 in quantity of light in accordance with the results of measurement under conditions of substantially the same as actual exposure, and thereby, quality images can be obtained.

In a case of a full-color printer, first, only light shutter elements which are on odd numbers in the light shutter array are driven at a specified frequency (depending on the image density in the sub scanning direction) to output a specified quantity of light (duty or intensity), and the color of the light is switched in synchronization with the drive. Meanwhile, the measuring unit 71 is moved forward to measure the quantities of light outputted from the light shutter elements at times of emitting RGB colors at different duties. The measuring unit 71, while moving backward, measures the quantities of light outputted from light shutter elements which are on even numbers at times of emitting RGB colors at different duties in the same manner.

In order to make an accurate light-quantity correction to each light shutter element, it is effective to measure the quantities of light at four levels including the quantity of light in an off-state (quantity of leakage light). During the measurement, the color switching speed is reduced to one fourth of the speed for actual image formation, and with respect to each color, the quantities of light at four levels are measured. Twelve kinds of quantities of light (RGB×4) outputted from each light shutter element are measured during one scan. Integrated values of photoelectric outputs of the sensor 72 are sampled/held and subjected to A/D conversion, and in the control section, an approximate output light-quantity characteristic curve is made based on the values at the four levels. Then, the light-quantity correction is carried out referring to the curve. The light quantity correction is carried out based on the light shutter element which has a minimum measured value. Data for the correction are stored in a memory for a look-up table (for example, a flash ROM).

Further, the color switching speed during the measurement may be equal to that for actual image formation. In this case, for measurement of the quantities of light at a plurality of levels with respect to each color, the driving frequency is heightened. Furthermore, if both the color switching speed and the driving frequency during the measurement are equal to those for actual image formation, the quantities of light at a plurality of levels are measured during a plurality of scans.

In the first embodiment, during one reciprocate scan, all the light shutter elements are subjected to the light-quantity measurement. However, it is possible to divide the measurement according to levels and colors. In this case, the number of scans for the measurement is increased, thereby consuming time, but it has an advantage that the integrating circuit can be simplified.

The number of levels of the quantity of light to be measured depends on the output characteristics of the light shutter elements. If the light shutter elements have output characteristics of good linearity, measurement of the quantities of light at two levels is practical. Further, if the quantity of leakage light is zero, the quantity of light at one level is practical. However, the outputs of light shutter elements generally do not have ideal linearity, and measurement of the quantities of light at four levels is practical to any element. With respect to the light colors, if the light shutter elements have the same output characteristic in outputting light of any of the colors, measurement with respect to only one color is enough for correction. Also, if there is such small differences in output characteristic among the light colors as to be allowable, only measurement with respect to green or white is sufficient.

Light shutter elements made of PLZT change their light transmitting characteristics according to the driving voltage applied thereto. Therefore, preferably, during the measurement, a driving voltage with the same waveform as that of the driving voltage for actual image formation is applied to the light shutter elements. A specific way is to apply a voltage which is optimal for blue exposure to the light shutter elements for the light-quantity measurement with respect to blue and the other colors (red and green).

Another way is to apply voltages which are optimal for exposures of the colors to the light shutter elements for the measurement with respect to the respective colors. In the first embodiment, the driving voltage must be changed at a high speed, thereby causing rounding of the waveform of the driving voltage. Therefore, in the first embodiment, it is preferred that identical power sources or a single power source are/is used for the measurement and for actual image formation.

In the above-described light-quantity measuring method, the address of each light shutter element is determined based on the output of the sensor 72 without using any special devices for determination on the address. Therefore, when the measuring device 70 is used to test an optical write head, by counting the number of samplings between peaks of the output waveform, trouble (pitch error, errors in alignment of the light shutter elements, etc.) of the optical write head can be detected. Also, when the measuring unit 71 is employed in a printer provided with an optical write head, by counting the number of samplings between peaks, abnormal movement of the measuring unit 71 can be detected. In case of abnormal movement of the measuring unit 71, the abnormality is displayed and warned, and the printer is stopped. Further, when the measuring unit 71 is employed in a printer, light-quantity correction which copes with aging of the light shutter elements becomes possible.

Image data read by a film scanner are unfolded on a bit map memory of the image memory. Corrections are made to the data on the bit map memory referring to the look-up table which is stored with light-quantity correction data, and the corrected data are transmitted to the driver of the light shutter module 30. Thus, an image with a density equal to that of the original image can be reproduced while the light color is switched at a specified speed.

Further, it is possible to carry out the light-quantity measurement and the light-quantity correction at any time as well as the time of warm-up operation of a printer.

Furthermore, the first embodiment can be so modified that light emergent from the optical write head 20 is partly directed to the sensor 72 of the measuring unit 71 which is in the retreating position indicated by the alternate long and short dash line in FIG. 11 while the optical write head 20 is operating for actual image formation. More specifically, a dummy light shutter element is additionally provided to the light shutter module 30, and the output light of the dummy light shutter element which is driven under specified conditions (duty and frequency) is directed to the sensor 72. It is also possible to direct light emitted from the halogen lamp 21 to the sensor 72 via an optical guide fiber (not shown). In such a structure, the quantity of light outputted from the optical write head 20 during image formation can be monitored, and by carrying out correction or raising an alarm comparing the monitored value with a reference value, image formation can be stabilized.

In the printer, some kinds of print sheets with various widths can be set, and the optical write head 20 is capable of writing an image on a print sheet with the maximum width. Accordingly, the light-quantity measurement is not always carried out toward all the light shutter elements but is carried out toward only the light shutter elements which are to be used for image formation on the print sheet set in the sheet containing section. More specifically, the length of the movement of the sensor 72 in the main scanning direction is controlled in accordance with the width of the print sheet. With this arrangement, the measurement time and the calculation time can be shortened.

Structure and Operation of the Driver ICs

Figure 13:
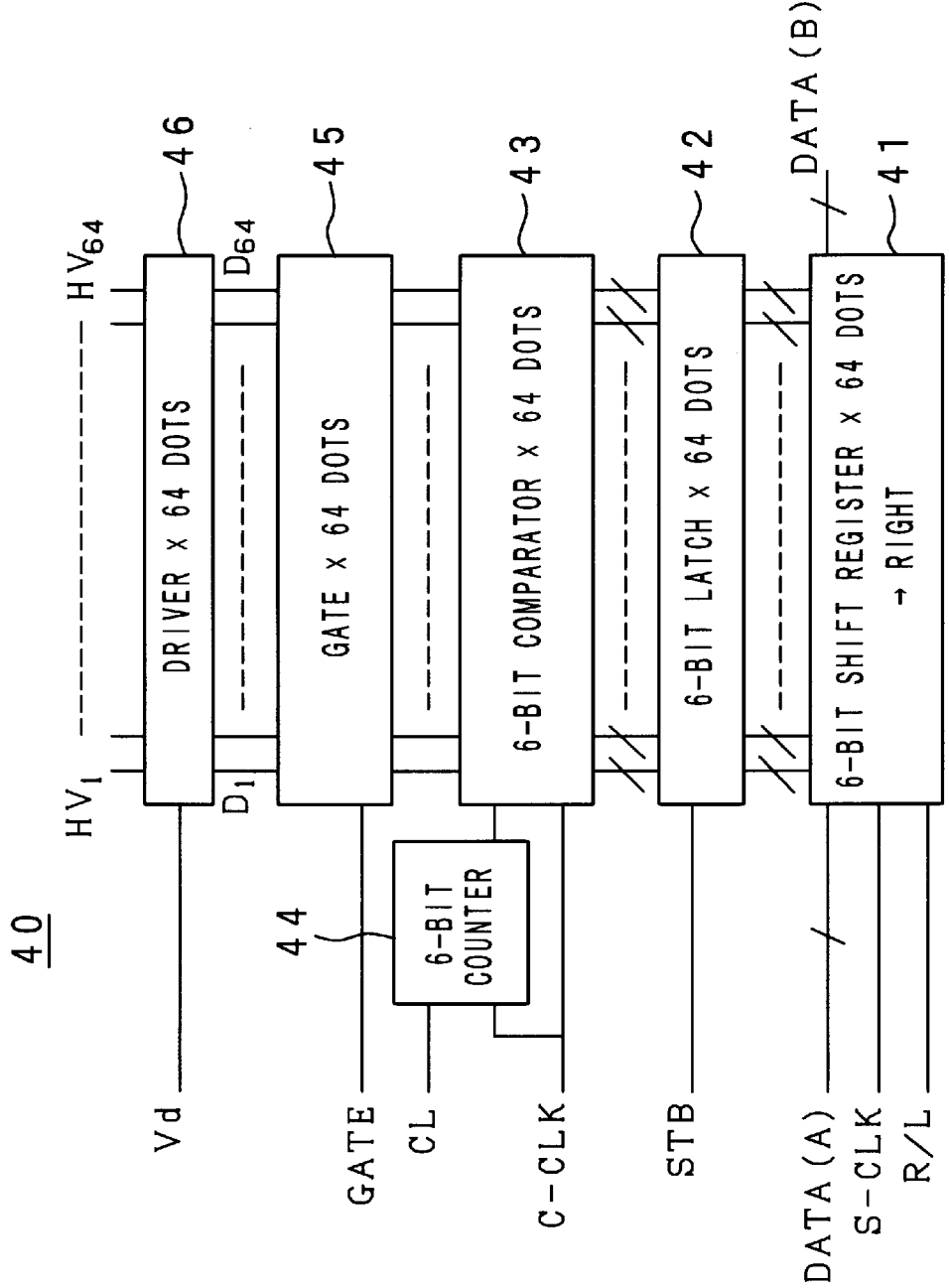
FIG. 13 is a block diagram of a driver IC for multi-tone image formation.

FIGS. 13 and 14 show the structure of a driver IC 40 for multi-tone image formation and the timing chart of its operation. For practical use, a plurality of driver ICs 40 are connected to each other by a ladder chain to drive 1024 shutter elements. Each driver IC 40 is to drive 64 light shutter elements, and comprises a six-bit shift register 41, a six-bit latch circuit 42, a six-bit comparator 43, a six-bit counter 44, a gate circuit 45 and a driver circuit 46.

Image data DATA(A) and DATA(B) are shifted into the shift register 41 based on a shift signal R/L in synchronization with a shift clock signal S-CLK and are latched in the latch circuit 42 controlled by a strobe signal STB. Thereby, the tone level of each pixel is set. The counter 44 counts the clock signal C-CLK, and the comparator 43 compares the counter value with the latched value. When the both values become equal, the gate circuits 45 stops the output. The counter 44 is cleared on receiving a clear signal CL.

A driving voltage Vd is applied to the driver circuit 46, and the driver circuit 46 outputs $HV_1$ through $HV_{64}$ to the shutter elements. The pulse widths of $HV_1$ through $HV_{64}$ are set in accordance with signals $D_1$ through $D_{64}$ sent from the gate circuit 45. Thus, each light shutter element is turned on for a time (pulse width) in accordance with image data DATA for the corresponding pixel.

Control for the light-quantity measurement toward an optical write head with the multi-tone driver ICs 40 is basically similar to the control of the two-value driver ICs 60. A specified quantity of light to be outputted from each light shutter element is commanded by a data signal DATA by use of a dip switch or the like. The data signal DATA is sent to the shift register 41 and latched controlled by the strobe signal STB, and a duty in accordance with the data signal DATA is produced in the comparator 43. Then, specified light shutter elements are driven to output the specified quantity of light controlled by a gate signal GATE. Such signals for thin-out driving are repetitious signals and are produced in a comparatively simple circuit.

In the structure wherein the light shutter elements are arranged in two lines staggeringly, that is, in a line of odd numbers and in a line of even numbers, the thin-out driving can be carried out by setting the data signal DATA to be sent to one of the lines at "H" level, which is simpler control. In order to vary the quantity of light to be outputted from each light shutter element, the setting of the dip switch is changed.

Second Embodiment

The second embodiment embodies a method of finding out the address of each light shutter element and measuring the quantity of light outputted therefrom. In the second embodiment, the optical write head and the measuring unit shown by FIGS. 1 and 11 are used. Therefore, in the following description, the members of the optical write head and the measuring unit are provided with the same reference symbols as those in the first embodiment.

For accurate light-quantity measurement, it is better to measure the quantity of light outputted from each light shutter element of an optical write head while the element and nearby elements are driven at the same time (all driving) than to measure the same while the elements are driven one by one in order because the measurement result in the former includes the quantity of light leaking and entering from the nearby elements. However, in the former (all driving), it is difficult to find out the address of the element which is subjected to the measurement, and therefore, in the second embodiment, thin-out driving is also adopted to address each element.

Figure 15A:
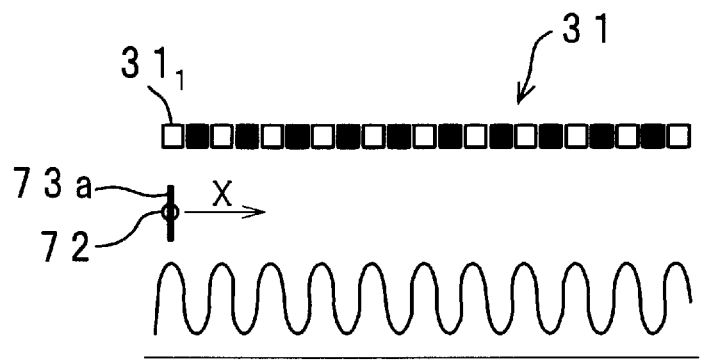
FIGS. 15a and 15b are charts showing a first example of the light-shutter-element addressing and light-quantity measuring method of the second embodiment.
Figure 15B:
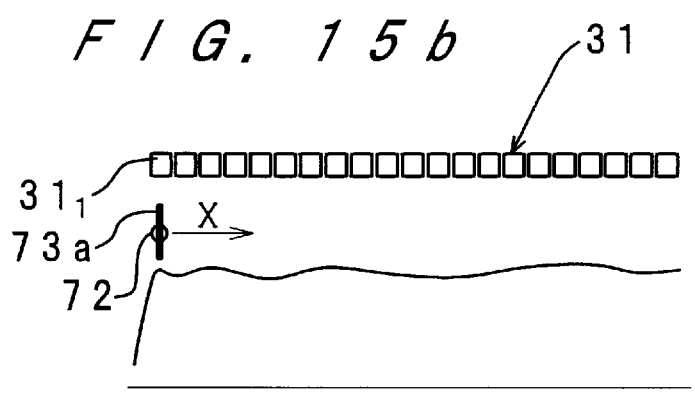

FIGS. 15a and 15b show a first example of the addressing and measuring method. FIG. 15a shows an output waveform of the sensor 72 while only the light shutter elements which are on odd numbers in the light shutter array are driven (thin-out driving), and based on the output waveform, the respective addresses of all the light shutter elements are determined. FIG. 15b shows the output waveform of the sensor 72 while all the light shutter elements are driven (all driving). The position of the first light shutter element $31_1$ is apparent from the rising characteristic or the first peak of the output waveform at the time of thin-out driving, and accordingly, the addresses of the other elements are determined. Then, the quantity of light outputted from each element is determined based on the output waveform of the sensor 72 at the time of all driving in consideration of the address recognized from the output waveform at the time of thin-out driving.

Figure 16:
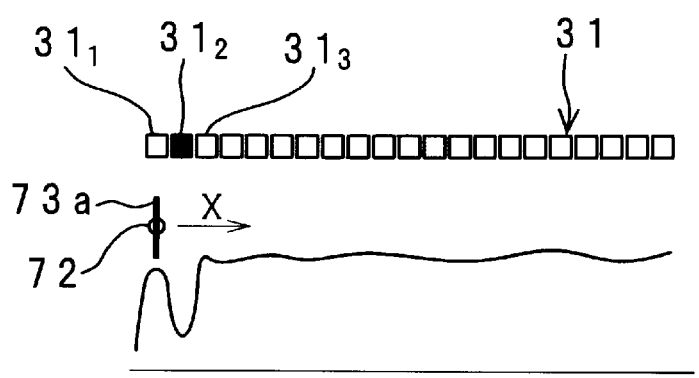
FIG. 16 is a chart showing a second example of the light-shutter-element addressing and light-quantity measuring method.

FIG. 16 shows a second example of the addressing and measuring method. In the second example, during one scan of the sensor 72, both the addressing and the light-quantity measurement are carried out. The sensor 72 is moved in the main scanning direction X for the measurement while all the light shutter elements other than the second element $31_2$ are driven. The lower part of FIG. 16 shows the output waveform of the sensor 72 at this time. In this case, the first element $31_1$ is in the state of thin-out driving, and the position of the first light shutter element $31_1$ is apparent from the rising characteristic or the peak of the output waveform, and the quantity of light of each of the third and succeeding elements is determined based on the output waveform. In this example, only the third and succeeding elements are used for actual image formation. This second example is usable only when information on the positions of the respective light shutter elements is available from an output waveform of the sensor 72 at the time of thin-out driving which has been obtained beforehand or from designed values.

Figure 17A:
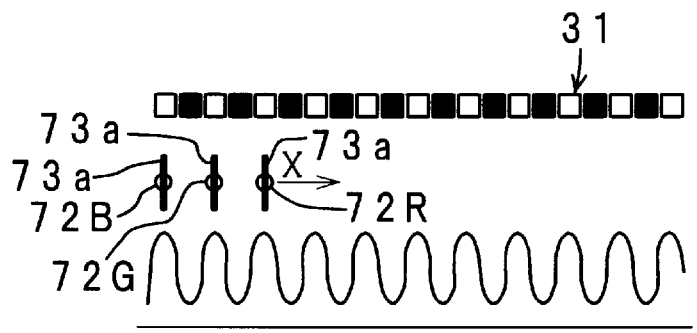
FIGS. 17a and 17b are charts showing a third example of the light-shutter-element addressing and light-quantity measuring method.
Figure 17B:
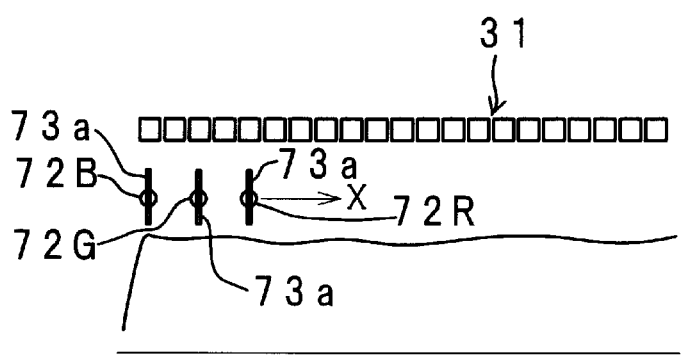

FIGS. 17a and 17b show a third example of the addressing and measuring method. In the third example, color sensors 72R, 72G and 72B are used to measure the quantity of red light, the quantity of green light and the quantity of blue light, respectively, outputted from each light shutter element. Thin-out driving and all driving of the light shutter elements are carried out in the same way as the first example shown by FIGS. 15a and 15b. Each of the sensors 72R, 72G and 72B outputs waveforms as shown by 17a and 17b at the time of thin-out driving and at the time of all driving, respectively. From the measurement results with respect to each of the colors, the address of each light shutter element and the quantity of light outputted therefrom are determined. In this example, white light is incident to the light shutter elements, and a color correction filter (not shown) is provided to each of the sensors 72R, 72G and 72B. It is possible to determine the address of each element from the measurement results by use of either one of the sensors 72R, 72G and 72B.

Figure 18:
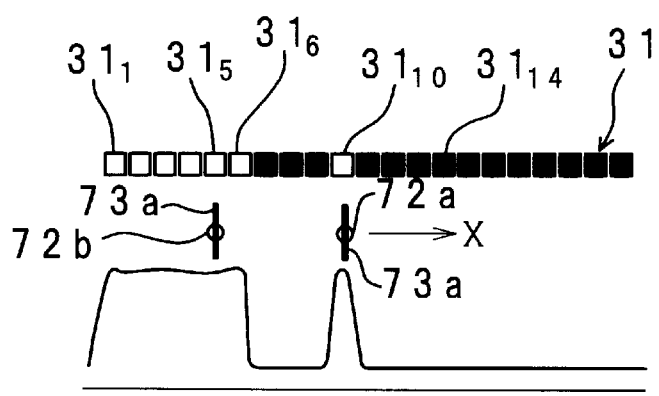
FIG. 18 is a chart showing a fourth example of the light-shutter-element addressing and light-quantity measuring method.

FIG. 18 shows a fourth example of the addressing and measuring method. In the fourth example, six serial light shutter elements $31_1$ through $31_6$ and the tenth elements $31_{10}$ are driven at a time, and all the elements are driven in the same pattern in order. While the elements are driven in this way, two sensors 72a and 72b which are located apart from each other at a distance of five elements are moved together in the main scanning direction X to measure the quantity of light outputted from each element. The lower part of FIG. 18 shows the output waveforms of the sensors 72a and 72b. In this case, the elements $31_1$ through $31_5$ are in the state of all driving, and the tenth element $31_{10}$ is in the state of thin-out driving. The position of the tenth element $31_{10}$ is apparent from the rising characteristic or the peak of the output waveform of the sensor 72a, and the addresses of the elements $31_1$ through $31_5$ can be figured out from the position of the tenth element $31_{10}$. Then, the quantity of light outputted from each of the elements $31_1$ through $31_5$ is determined based on the output waveform of the sensor 72b. Next, while the elements $31_5$ through $31_{10}$ and $31_{14}$ are driven, the measurement is carried out by use of the sensors 72a and 72b, and in the same way, the address of each of the elements $31_6$ through $31_9$ and the quantity of light outputted therefrom are determined. Then, while the sensors 72a and 72b are moved in the main scanning direction X, the quantities of light of all the light shutter elements are determined in the same manner. Needless to say, various driving patterns (combination patterns of thin-out driving and all driving) are possible as well as the pattern shown by FIG. 18.

Figure 19:
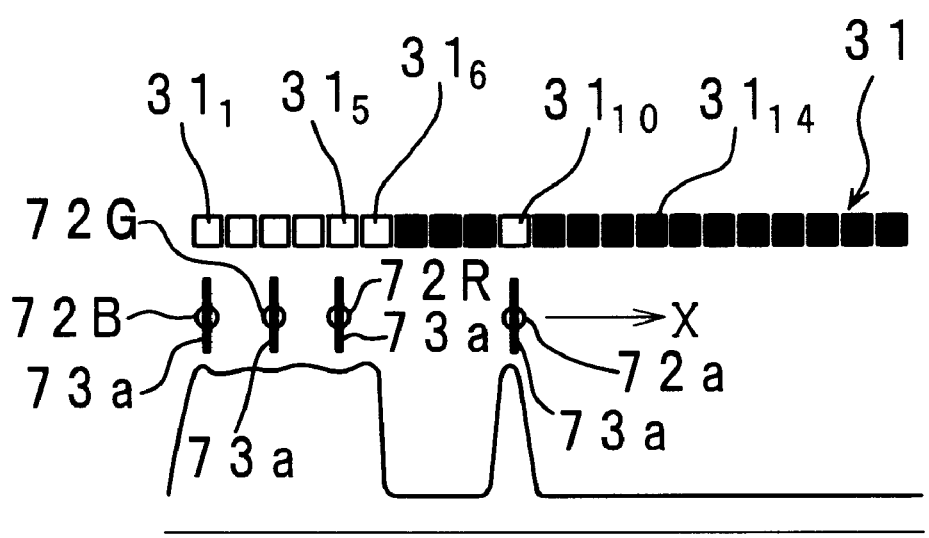
FIG. 19 is a chart showing a fifth example of the light-shutter-element addressing and light-quantity measuring method.

FIG. 19 shows a fifth example of the addressing measuring method. In this fifth example, an addressing sensor 72a and color sensors 72R, 72G and 72B are used. The light shutter elements are driven in the same pattern as described in the fourth example, and the sensors 72a, 72R, 72G and 72B are moved in the main scanning direction X to measure the quantity of light outputted from each element. As in the third example, white light is incident to the light shutter elements, and a color correction filter (not shown) is provided to each of the color sensors 72R, 72G and 72B. The address of each element is determined based on the output waveform of the sensor 72a, and the quantity of light outputted from each element is determined based on the output waveforms of the sensors 72R, 72G and 72B.

Third Embodiment

Figure 20:
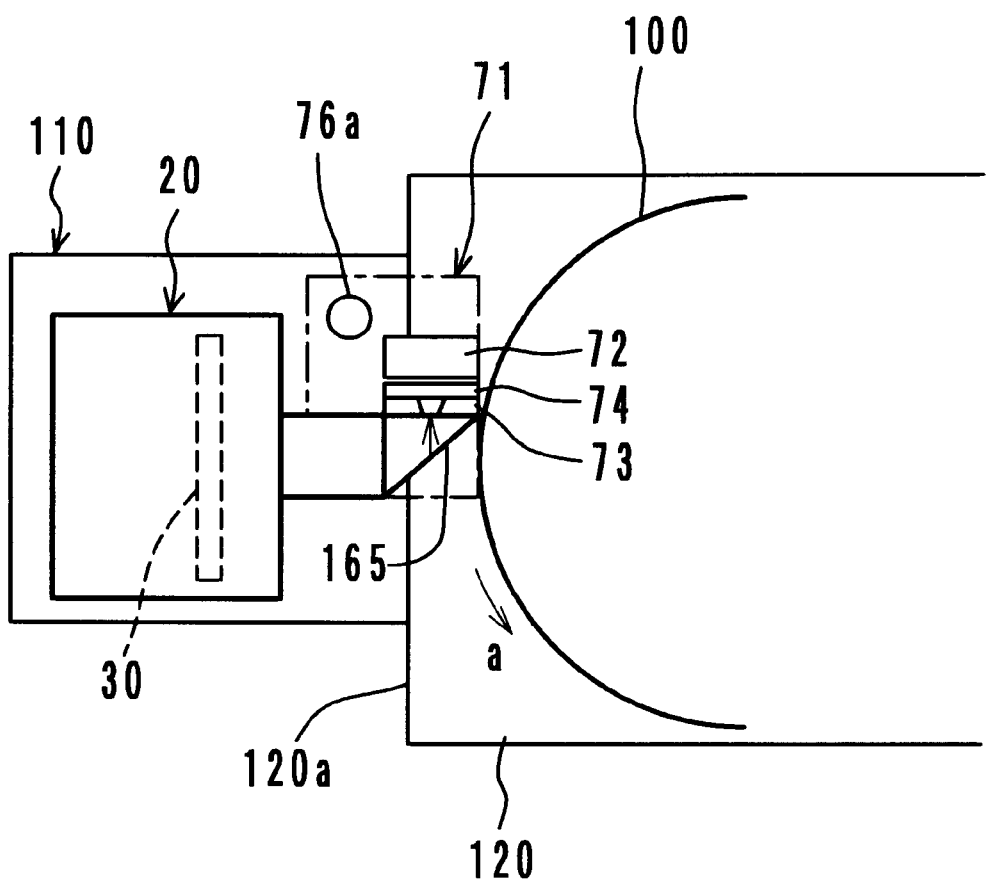
FIG. 20 is a schematic view of a main part of a color printer of the third embodiment of the present invention.
Figure 21:
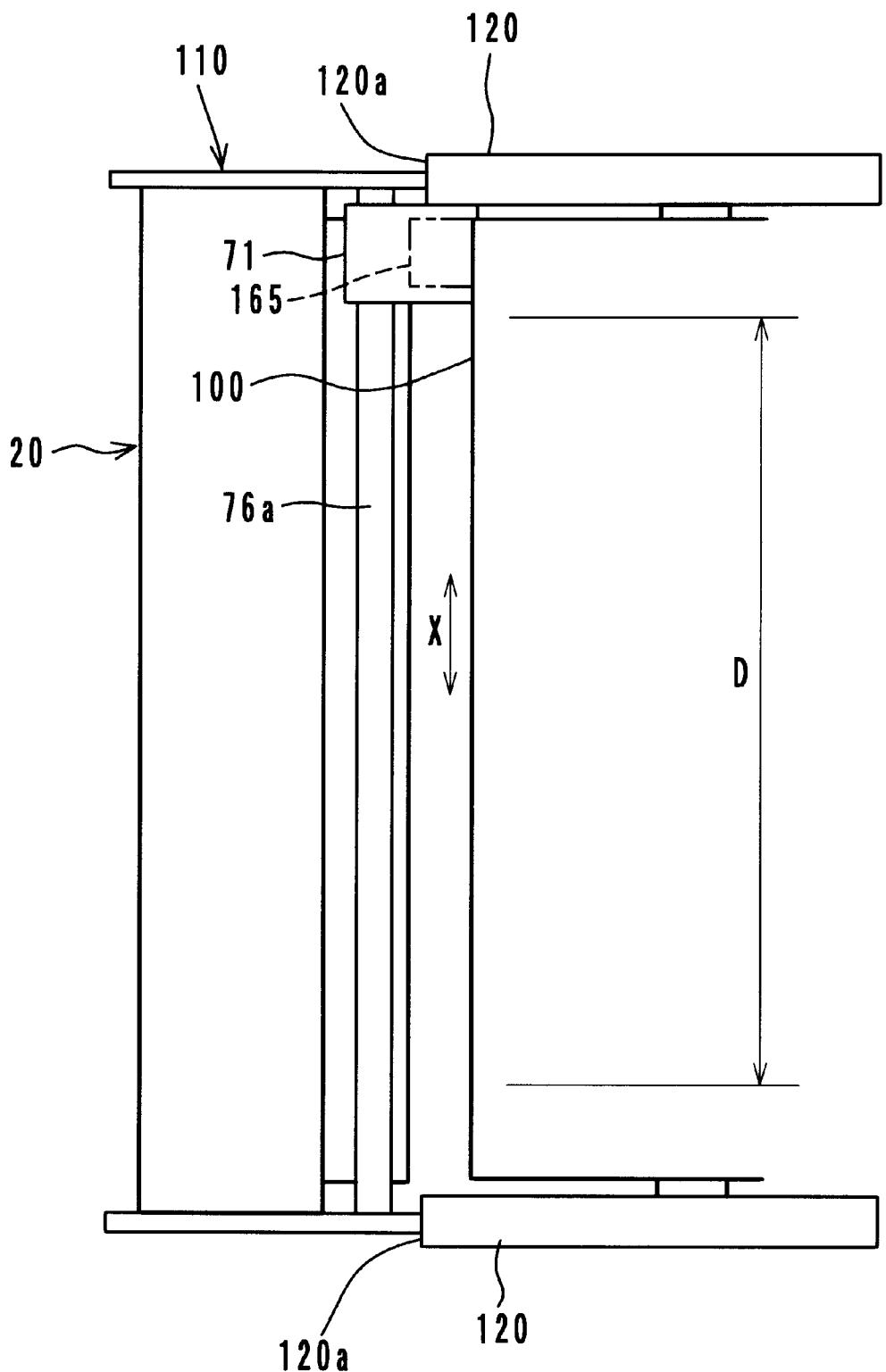
FIG. 21 is a plan view of the color printer of FIG. 20.

FIGS. 20 and 21 show the main part of the third embodiment. The third embodiment is a color printer which forms an image by use of a photosensitive drum 100 in an electrophotographic method. The photosensitive drum 100 is driven to rotate in a direction indicated by arrow "a", and the optical write head 20 shown by FIG. 1 is used to write an image. Around the photosensitive drum 100, there are provided an electric charger, a developing device, a transfer charger, etc. These devices are well known, and the descriptions thereof are omitted.

The light-quantity measuring unit 71 adopted in the third embodiment is basically of the same structure as the one shown by FIG. 11. However, a prism 165 for deflecting light (a mirror or any deflecting member) is additionally provided. The measuring unit 71 is initially in a retreating position outside an image forming area D (see FIG. 21) of the photosensitive drum 100 and is capable of moving from the retreating position and reciprocating in the main scanning direction X with rotation of the guide shaft 76a driven by the motor 93 (see FIG. 11). For light-quantity measurement, light emergent from the optical write head 20 is reflected by the prism 165 and incident to the sensor 72 through the slit plate 73 and the light dispersing plate 74. The light-quantity measurement by use of the sensor 72 is carried out in the same way as described referring to FIGS. 3, 4 and 5 or as described in the second embodiment. The drive of the optical write head 20 during the measurement is the same as described in the first embodiment.

The printer of the third embodiment can be so structured that while the optical write head 20 is writing an image, the quantity of light emergent from the optical write head 20 can be monitored by the measuring unit 71 which is in the retreating position. In this case, a dummy light shutter element which is additionally provided to the optical write head 20 is driven under specified conditions (duty and frequency), and the light outputted from the dummy element is directed to the sensor 72. It is also possible to direct light emitted from the halogen lamp 21 to the sensor 72 via an optical guide fiber (not shown).

In the third embodiment, the optical write head 20, the prism 165, the measuring unit 71 and its reciprocating mechanism form an exposure unit 110. Like the first embodiment, by adjusting the focal position of the optical write head 20, etc. before fitting the exposure unit 110 in a frame 120 of the printer, adjustment after the fitting can be omitted.

FIG. 22 shows a measuring device 130 for adjustment of the exposure unit 110 before assembly, and the device 130 corresponds to the measuring device 70 shown in FIG. 2. In the measuring device 130, a tool maker's microscope 132 provided with a CCD camera 133 is disposed in an adjusting jig 131 in such a way to be capable of moving in the main scanning direction along a guide shaft 134, and images photographed by the CCD camera 133 are displayed on a monitor display 135. The adjusting jig 131 has a fitting surface 131a which is identical to the fitting surface 120a of the frame 120 (see FIGS. 20 and 21), and the exposure unit 110 is fitted on the fitting surface 131a. The microscope 132 has a focal point 132a at a position corresponding to the light receiving surface of the photosensitive drum 100, and when the optical write head 20 is set in a specified position, light emergent therefrom is imaged on the focal point 132a.

While the optical write head 20 is driven and the microscope 132 is moved in the main scanning direction, inclination is adjusted so that the light comes to the center of the field of view, and focusing of the optical write head 20 is carried out by moving the optical write head 20 in a direction indicated by arrow "b" in the exposure unit 110. For the focusing of the optical write head 20, it is possible that, during a thin-out drive of the light shutter elements, the optical write head 20 is automatically moved in accordance with the output of the CCD camera 133.

Next, the position of the sensor 72 is adjusted by moving the whole measuring unit 71 in a direction indicated by arrow "c". This adjustment is carried out so that the output signal-to-noise ratio of the sensor 72 will be a maximum. Generally, the position of the sensor 72 hardly shifts, and this adjustment can be omitted.

Further, the measuring unit 71 which is additionally provided with a deflecting member can be employed in an apparatus which forms an image on a print sheet, a film or the like as well as a printer which forms an image on a photosensitive drum by an electrophotographic method.

Fourth Embodiment

Figure 23:
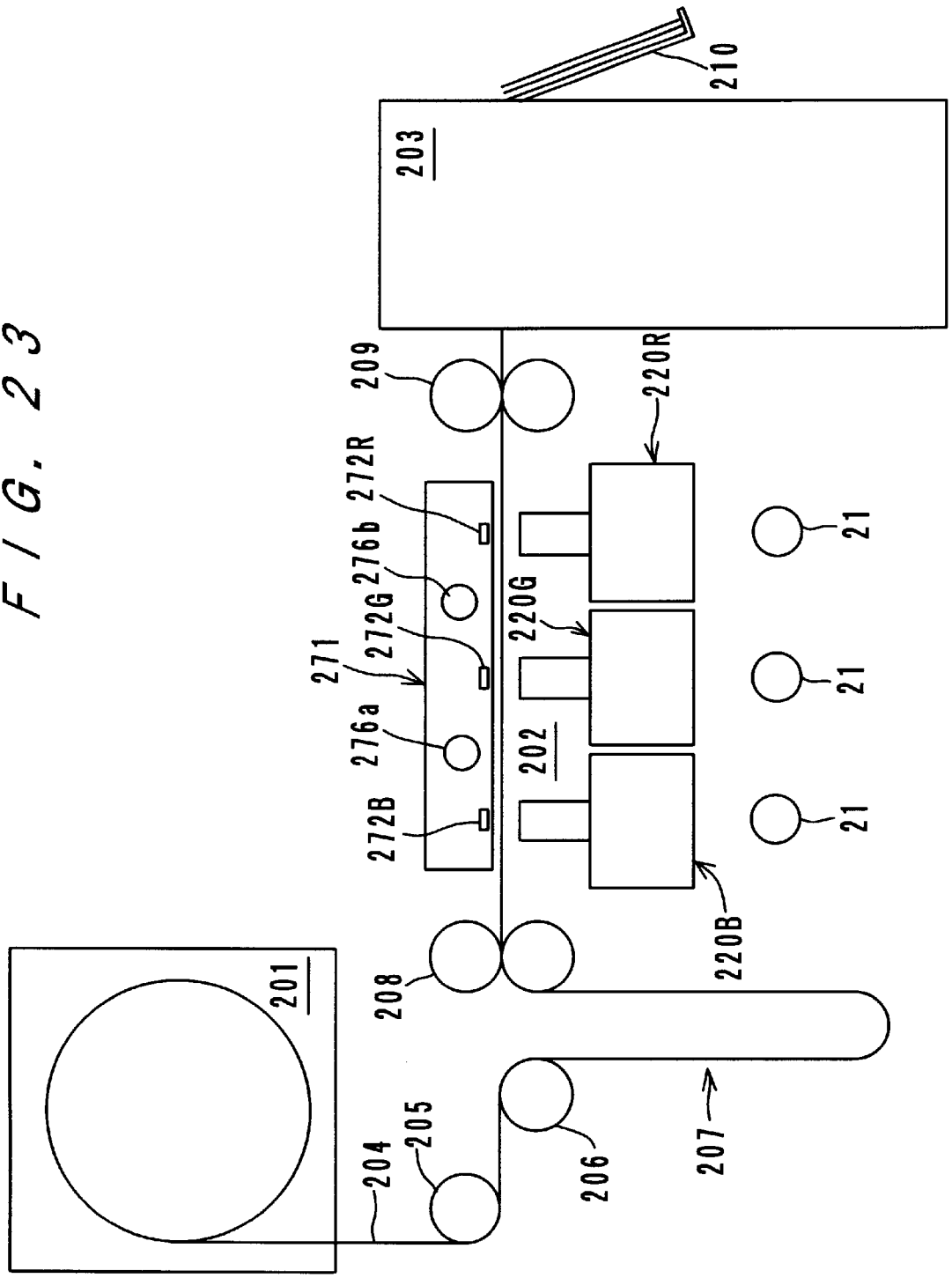
FIG. 23 is a schematic view of a color printer of the fourth embodiment of the present invention.

FIG. 23 is a schematic view of a color photoprinter. The color printer comprises a print sheet containing station 201, an exposure station 202 and a processing station 203. A print sheet 204 is contained in the station 201 in the form of a roll and is drawn to a loop forming stage 207 guided by guide rollers 205 and 206. In the exposure station 202, three optical write heads 220 (220B, 220G and 220R) shown by FIG. 24 and a light-quantity measuring unit 271 shown by FIG. 25) are provided.

The print sheet 204 is transported to the right in FIG. 23 by pairs of transport rollers 208 and 209 guided by a guide plate (not shown) with its photosensitive side facing down.

The print sheet 204 is exposed to lights emergent from the optical write heads 220, and thus, a latent image is formed thereon. After the exposure, the print sheet 204 is subjected to development and is cut into a specified size in the processing station 203 and is discharged onto a tray 210. Lights of the three primary colors, namely, blue (B), green (G) and red (R) are emergent from the three optical write heads 220B, 220G and 220R, respectively, in synchronization with the transport of the print sheet 204 to form a full-color image on the print sheet 204.

Figure 24:
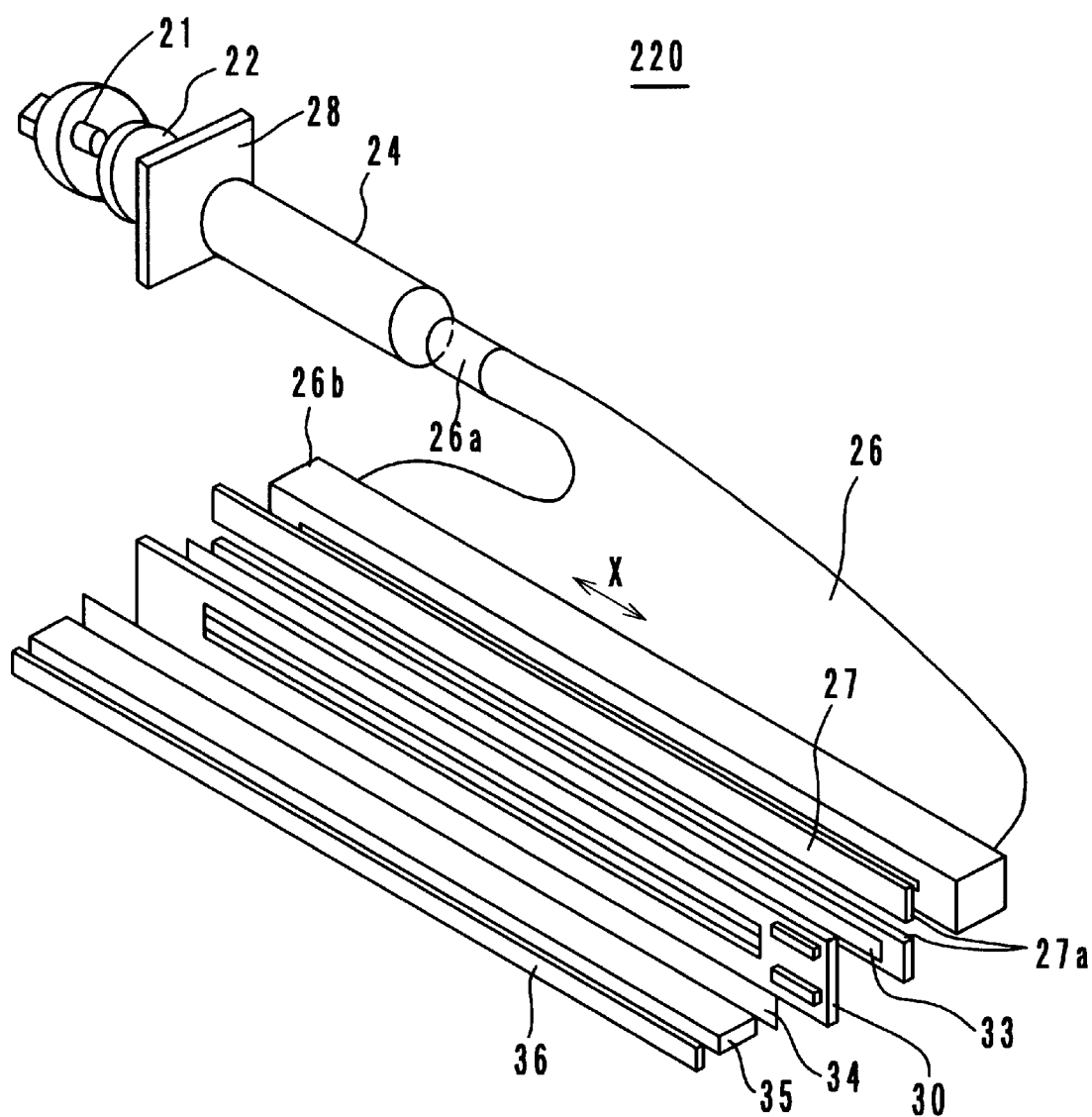
FIG. 24 is a perspective view of an optical write head provided in the color printer of FIG. 23.

Each of the optical write heads 220, as shown in FIG. 24, is basically of the same structure as the optical write head 20 shown by FIG. 1. The same parts and members are provided with the same reference symbols, and the descriptions thereof are omitted. What is different from the optical write head 20 is to omit the RGB filter 25 and to have a color separation filter 28 instead of the color correction filter 23. In the optical write heads 220, white light emitted from the halogen lamp 21 is separated into blue, green and red by the color separation filter 28. Further, a mechanical shutter (not shown) is provided to each of the optical heads 220 so as to prevent light leakage from the halogen lamp 21 in an undriven state. It is possible to provide a color correction filter or an ND filter at the light source section.

Next, the light-quantity measuring unit 271 for measuring the quantity of light outputted from each light shutter element of the optical write heads 220B, 220G and 220R is described.

Figure 25:
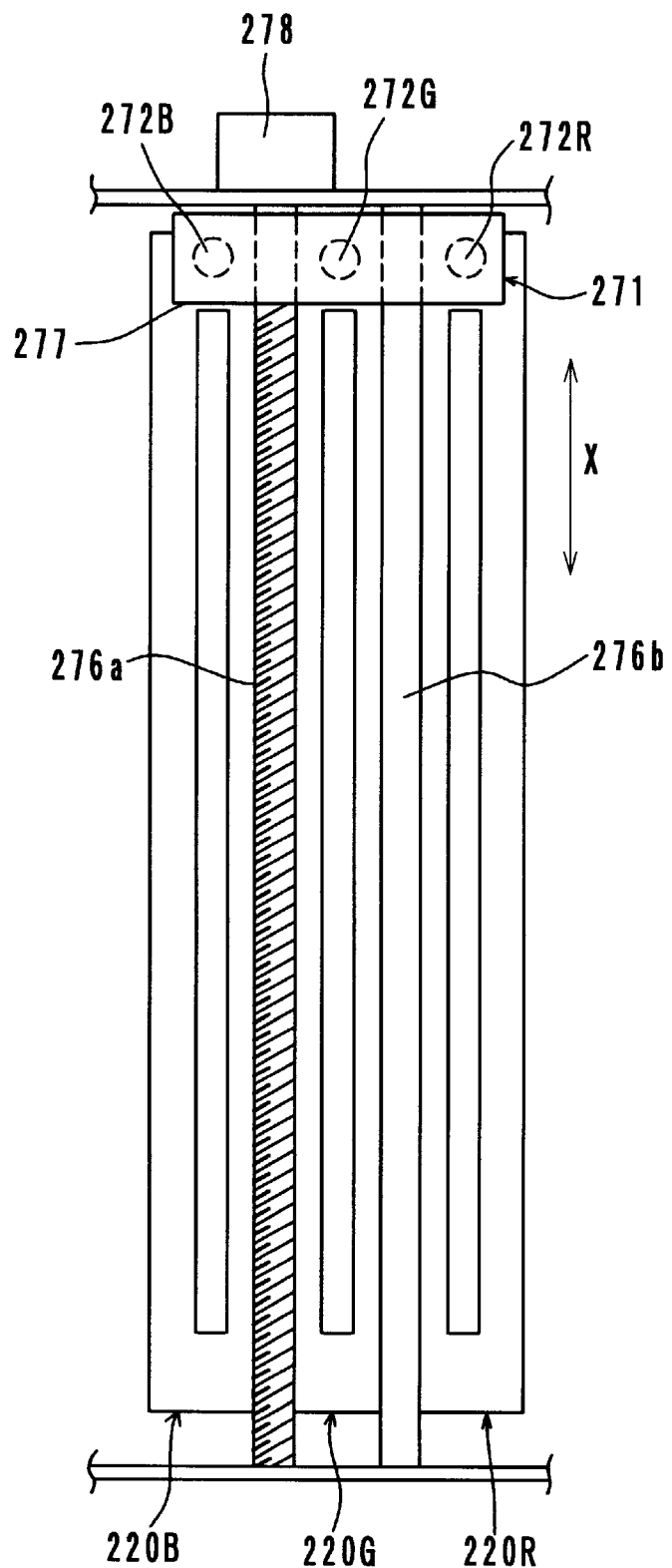
FIG. 25 is a plan view of an exposure station of the color printer.

The measuring unit 271, as shown in FIG. 25, three photoelectric conversion sensors 272 (272B, 272G and 272B) in a casing 277, and the casing 277 is capable of sliding on guide shafts 276a and 276b. The guide shafts 276a and 276b extend in a main scanning direction, and the measuring unit 271 reciprocates in the main scanning direction at a constant speed with the sensors 272B, 272G and 272R located right above the light shutter arrays of the optical write heads 220B, 220G and 220R respectively. The guide shaft 276a is connected to a motor 278. The guide shaft 276a has a male screw on the circumference, and a nut (not shown) provided to the casing 277 is in engagement with the male screw.

Usually, the measuring unit 271 is in a retreating position shown by the solid line in FIG. 25, that is, outside a main scanning area of the optical write heads 220. With forward/reverse rotation of the guide shaft 276a driven by the motor 278, the measuring unit 271 reciprocates in the main scanning direction to measure the quantity of light emitted from the optical write heads 220B, 220G and 220R. During the light-quantity measurement, the print sheet 204 must not exist in the exposure station 202. Therefore, the light-quantity measurement is carried out at a time of loading a new print sheet 204 or at a time of warm-up operation of the printer. Otherwise, prior to the light-quantity measurement, the transport rollers 208 are reversed to transport the print sheet 204 back to the loop forming stage 207.

The light-quantity measurement toward the optical write heads 220 by use of the measuring unit 271 is carried out in the same way as described referring to FIGS. 3, 4 and 5 or as described in the second embodiment.

In the fourth embodiment, the sensors 272B, 272G and 272R which are to measure the quantities of light emergent from the optical write heads 220B, 220G and 220R respectively are encased in the casing 277 to form a unit 271, and the unit 271 is driven by the motor 278. Thus, the mechanism for the light-quantity measurement is simplified and can be employed in a printer at low cost. Also, the use of three sensors 272B, 272G and 272R enables the light-quantity measurement toward the three optical write heads 220B, 220G and 220R to be carried out simultaneously during one scan, whereby the time for the measurement and production of correction data can be shortened.

Further, it is not always necessary to carry out the light-quantity measurement by use of the sensors 272B, 272G and 272R simultaneously. The fourth embodiment can be so structured that the sensors 272B, 272G and 272R are operated one by one. In the structure, during one scan, the light-quantity measurement and production of light-quantity correction data are carried out with respect to only one of the optical write heads 220B, 220G and 220R. In this case, although it takes more time for the measurement and the data production, only a single circuit is necessary for the measurement and the data production, thereby resulting in low cost.

Figure 26:
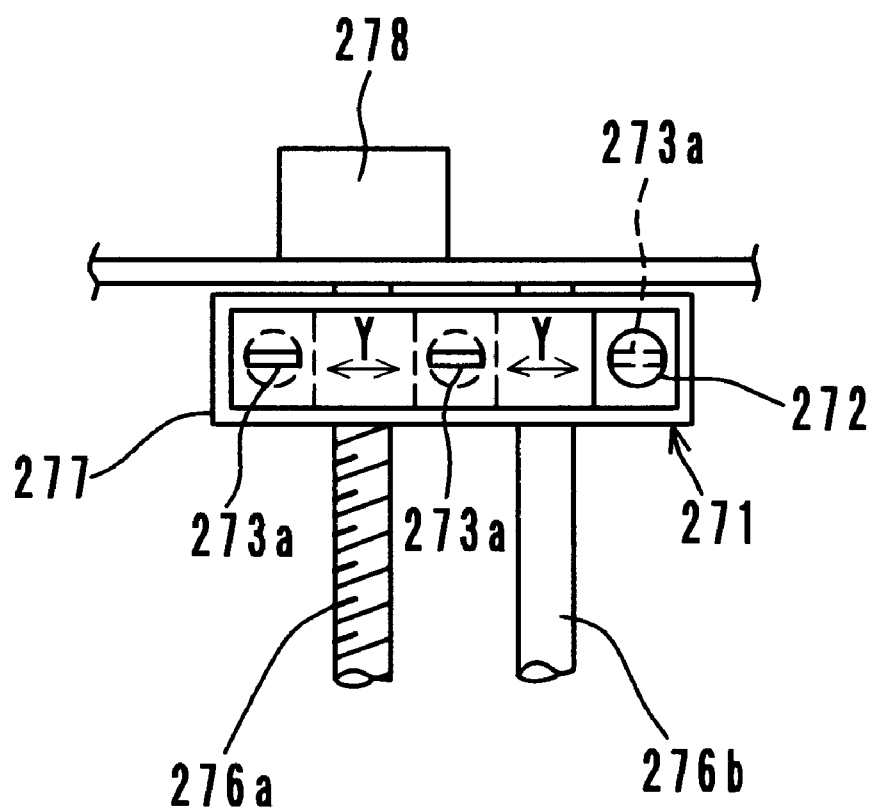
FIG. 26 is a plan view of a modified light-quantity measuring unit in the fourth embodiment.

FIG. 26 shows a case wherein a single sensor 272 is used for the light-quantity measurement toward the three optical write heads 220B, 220G and 220R. The sensor 272 is fitted in the casing 277 in such a way to be capable of sliding in a sub scanning direction (indicated by arrow "Y"), so that the sensor 272 can be positioned above any of the light shutter arrays of the optical write heads 220B, 220G and 220R.

Fifth Embodiment

Figure 27:
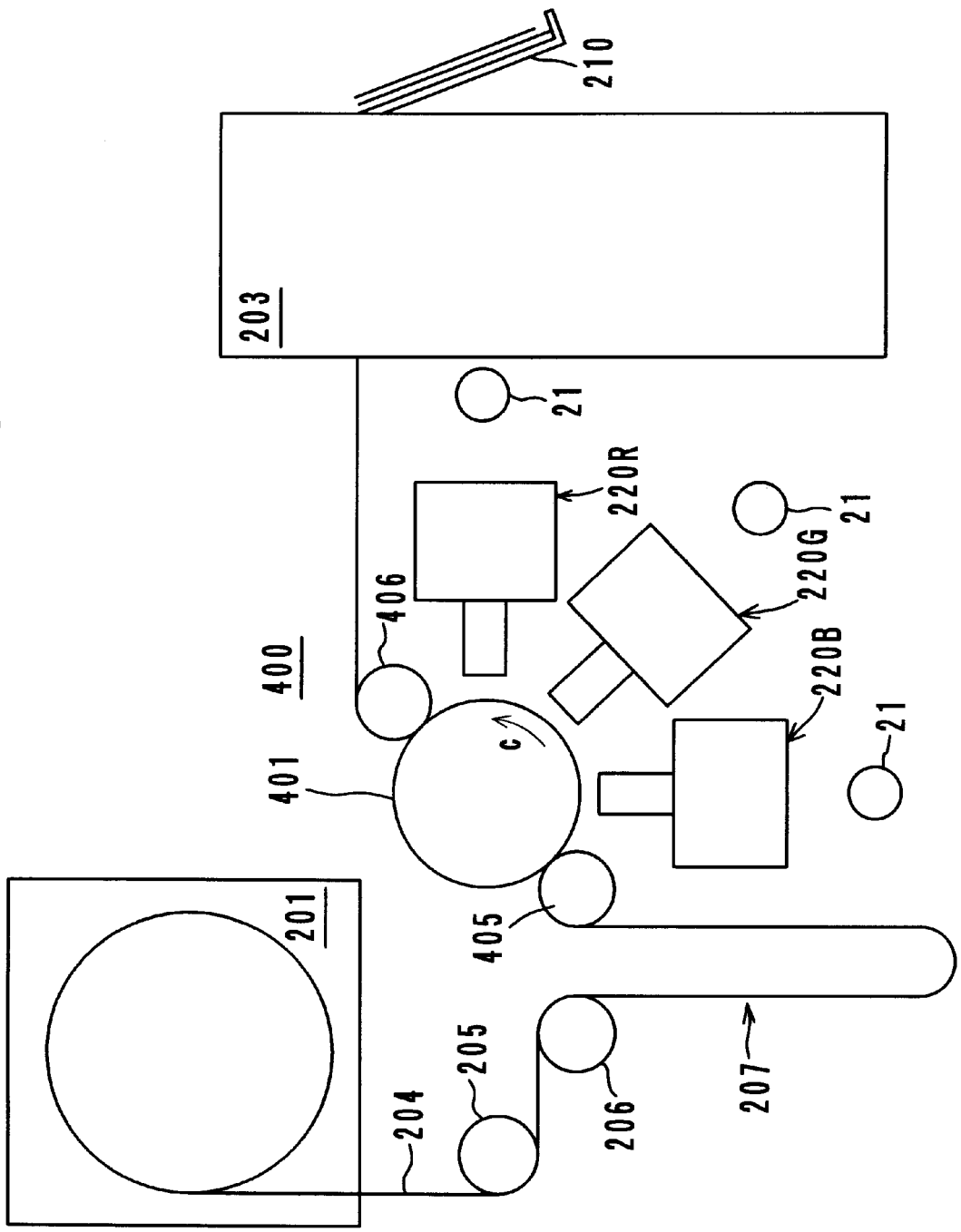
FIG. 27 is a schematic view of a color printer of the fifth embodiment of the present invention.

FIG. 27 shows the structure of the fifth embodiment. The fifth embodiment is a color photoprinter like the fourth embodiment shown in FIG. 23. The same members and parts as those in the fourth embodiment are provided with the same reference symbols, and the descriptions of these members are omitted. In the fifth embodiment, a guide drum 401 is provided in an exposure station 400.

More specifically, a print sheet 204 is held on the circumference of the guide drum 401 pressed by pressing rollers 405 and 406, and the print sheet 204 is transported in a sub scanning direction in accordance with rotation of the guide drum 401 in a direction indicated by arrow "c". The optical write heads 220B, 220G and 220R are arranged along the curvature of guide drum 401.

Figure 28:
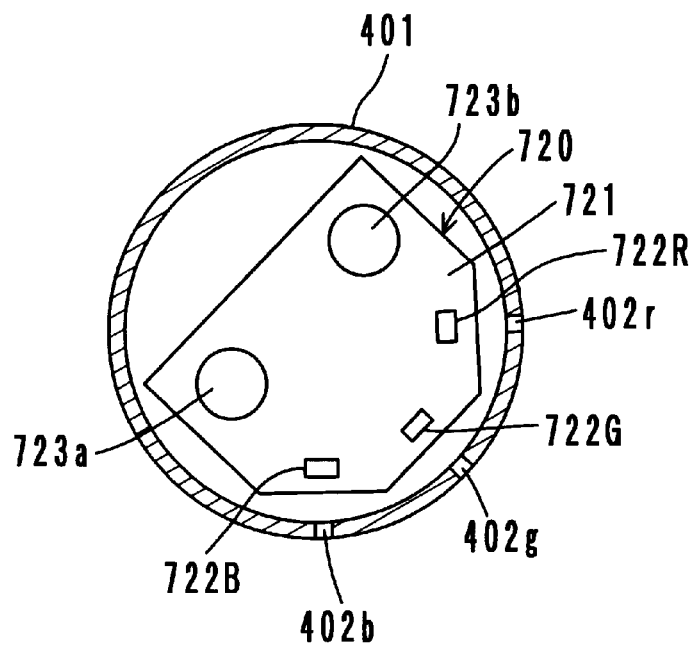
FIG. 28 is a sectional view of a light-quantity measuring unit provided in the color printer of FIG. 28.

As shown in FIG. 28, a light-quantity measuring unit 720 is located inside the guide drum 401. In the measuring unit 720, sensors 722B, 722G and 722R are fitted in a casing 721 at positions opposite the optical write heads 220B, 220G and 220R respectively, and the casing 721 is movable in a main scanning direction along guide shafts 723a and 723b. In the guide drum 401, slits 402b, 402g and 402r for light transmission are made. Light-quantity measurement and production of light-quantity correction data are carried out in the same way as described in the first embodiment or as described in the second embodiment.

The fifth embodiment has the advantages of the fourth embodiment. Additionally, because the print sheet 204 is transported around the circumference of the guide drum 401, the transportation of the print sheet 204 during exposure is stabilized, thereby improving the accuracy of registration. Further, in the fifth embodiment, it is not necessary to retract the measuring unit 720 from a main scanning area of the optical write heads 220.

Figure 29:
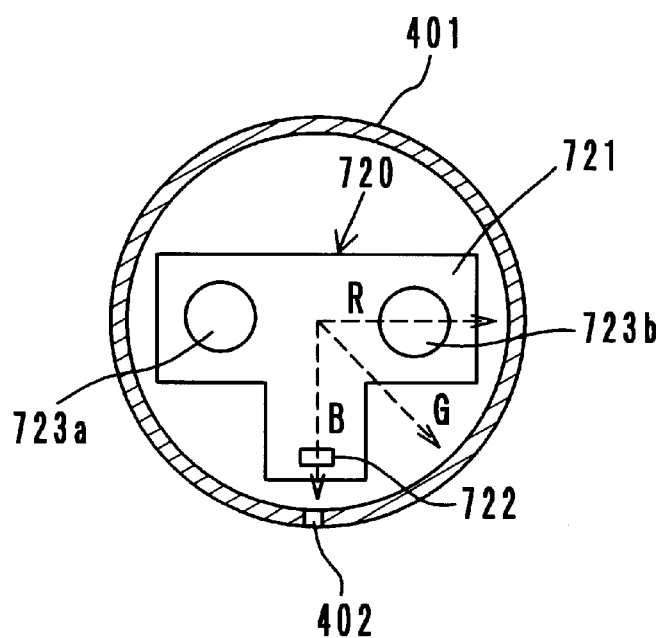
FIG. 29 is a sectional view of a modified light-quantity measuring unit in the fifth embodiment.

FIG. 29 shows a case wherein a single sensor 722 is used for the light-quantity measurement toward the three optical write heads 220B, 220G and 220R. For the light-quantity measurement, the sensor 722 of the measuring unit 720 is positioned opposite a slit 402 made in the guide drum 401, and the measuring unit 720 and the guide drum 401 are driven to rotate so that the sensor 722 will face to directions B, G and R, that is, face the optical write heads 220B, 220G and 220R via the slit 402.

A further possible structure is that a single sensor 722 is fixed inside the guide drum 401 whose inner surface is made as a light dispersing surface or a mirror surface so that the sensor 722 can measure the quantity of light which is emergent from each of the optical write heads 220B, 220G and 220R and incident into the guide drum 401 through the slit 402.

Also, in the fifth embodiment, if the guide drum 401 is made of a light transmitting material, the slits 402, 402b, 402g and 402r are not necessary.

Sixth Embodiment

Figure 30:
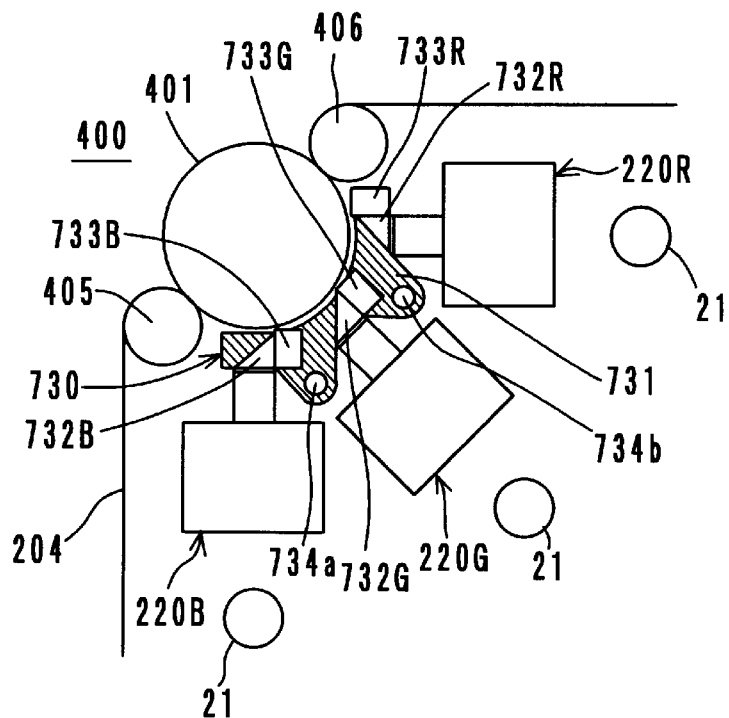
FIG. 30 is a schematic view of a color printer of the sixth embodiment of the present invention.

FIG. 30 shows the sixth embodiment. In the sixth embodiment, a light-quantity measuring unit 730 which has prisms 732B, 732G and 732R for deflecting light and sensors 733B, 733G and 733R is provided in the exposure station 400 of the fifth embodiment shown in FIG. 27. A casing 731 which has the shape of a shadowed part in FIG. 30 is driven by a motor (not shown) to be reciprocally movable in a main scanning direction of the optical write heads 220 along guide shafts 734a and 734b. The casing 731 is in a position outside a main scanning area at all times other than the time of light-quantity measurement.

For the light-quantity measurement, the casing 731, the prisms 732 and the sensors 733 move in the main scanning direction. Because the prisms 732B, 732G and 732R move along the light shutter arrays of the optical write heads 220B, 220G and 220R, the lights emergent from the light shutter arrays 220B, 220G and 220R are incident to the sensors 733B, 733G and 733R respectively.

Seventh Embodiment

Figure 31:
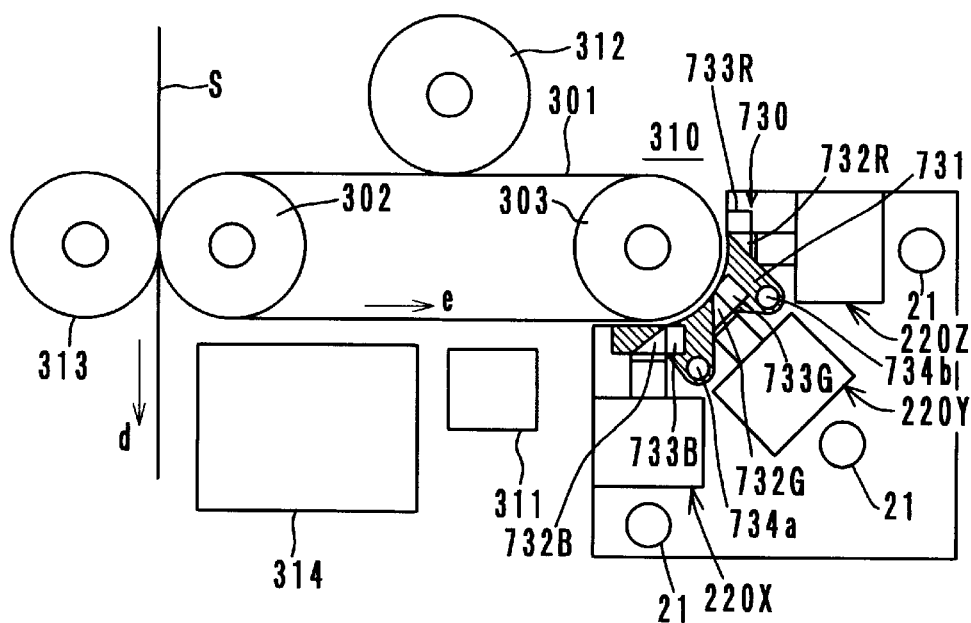
FIG. 31 is a schematic view of a color printer of the seventh embodiment of the present invention.

FIG. 31 shows the seventh embodiment. The seventh embodiment is an electrophotographic printer which is provided with three optical write heads 220X, 220Y and 220Z. The optical write heads 220X, 220Y and 220Z are so arranged that the respective light shutter arrays of adjacent optical write heads shift from each other in a main scanning direction by an amount of ⅓ of a pixel. The electrophotographic printer forms a latent image on a photosensitive belt 301 with the optical write heads 220X, 220Y and 220Z, develops the latent image and transfers the image onto a sheet S transported in a direction indicated by arrow "d".

Because of the shift of the optical write heads 220X, 220Y and 220Z in the main scanning direction, only with low-density optical tips, images with a high density, which can be realized by multiplying the performance of the optical tips by the number of optical write heads, can be formed. Based on the results of light-quantity measurement, suitable positioning of the optical write heads and suitable light-quantity correction are carried out.

The photosensitive belt 301 is an endless belt held by guide rollers 302 and 303 and is driven to rotate in a direction indicated by arrow "e". Around the photosensitive belt 301, there are provided an electric charger 311, a developing device 312, a transfer roller 313 and a belt cleaner 314. Like the sixth embodiment shown by FIG. 30, a light-quantity measuring unit 730 for measuring the quantities of light emitted from the optical write heads 220X, 220Y and 220Z in an exposure station 310. The measuring unit 730 is of the same structure as the one shown in FIG. 30, and the description thereof is omitted.

Eighth Embodiment

Figure 32:
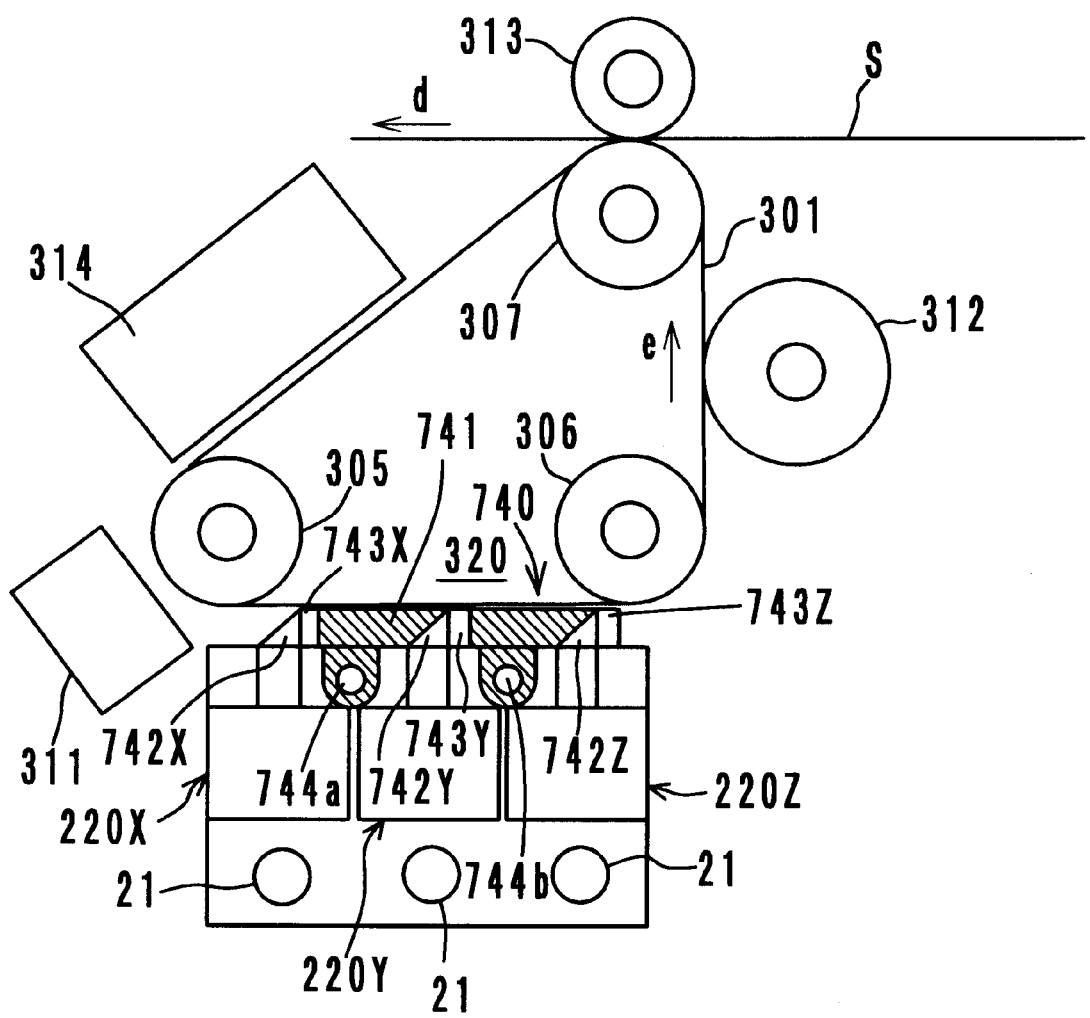
FIG. 32 is a schematic view of a color printer of the eighth embodiment of the present invention.

As FIG. 32 shows, the eighth embodiment is an electrophotographic printer which is similar to the seventh embodiment. In the eighth embodiment, the photosensitive belt 301 is held by three guide rollers 305, 306 and 307 and is driven to rotate in a direction of arrow "e". Around the photosensitive belt 301, there are provided an electric charger 311, a developing device 312, a transfer roller 313, a belt cleaner 314. The exposure station 320 is located in a flat portion of the photosensitive belt 301, and the optical write heads 220X, 220Y and 220Z are located as the optical write heads 220B, 220G and 220 of the fourth embodiment are (see FIG. 23). Further, the optical write heads 220X, 220Y and 220Z are so arranged that the respective light shutter arrays of adjacent optical write heads shift from each other in a main scanning direction by an amount of ⅓ of a pixel as those of the seventh embodiment.

Because of the shift of the optical write heads 220X, 220Y and 220Z in the main scanning direction, even with low-density light shutter tips, formation of high-density images becomes possible.

As the light-quantity measuring unit 730 employed in the sixth and seventh embodiments does, a light-quantity measuring unit 740 has prisms 742X, 742Y and 742Z for directing lights emergent from the optical write heads 220X, 220Y and 220Z to sensors 743X, 743Y and 743Z respectively. A casing 741 which has the shape of a shadowed part in FIG. 32 is driven by a motor (not shown) to be reciprocally movable in the main scanning direction of the optical write head 220 along guide shafts 744a and 744b. The casing 741 is in a position outside a main scanning area at all times other than the time of light-quantity measurement.

Other Embodiments

As well as the PLZT light shutter array, LEDs (light emitting diodes), LCSs (liquid crystal shutters), a DMD (deformable mirror device), an FLD (fluorescent device), etc. can be used as the optical array of an optical write head.

The modulation of the light shutter module for formation of a multi-tone image can be realized by pulse-intensity modulation as well as by pulse-width modulation.

Also, the drive of a light-quantity measuring unit may be carried out by any mechanism such as one using a belt and a wire as well as the mechanism wherein a guide shaft is rotated by a motor.

Further, the present invention is applicable to an image projector which projects an image onto a display as well as to an image forming apparatus which forms an image on a silver-salt print sheet and an image forming apparatus which forms an image on an electrophotographic photosensitive member.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A method for measuring a quantity of light emitted from an optical write device which drives an array of optical elements extending in a main scanning direction individually in accordance with image data, the method comprising the steps of:

moving a light-quantity sensor with a light-receiving slit in the main scanning direction with the light-receiving slit facing the array of optical elements;

driving at least two of the optical elements in such a way that at least two adjacent optical elements of the optical elements are not driven at the same time while moving the light-quantity sensor in the main scanning direction; and calculating a quantity of light outputted from each of the optical elements based on an output of the light-quantity sensor.

2. A light-quantity measuring method as claimed in claim 1, wherein:

each of the optical elements is driven at a specified frequency and a specified duty;

the light-quantity sensor carries out a plurality of samplings from each of the optical elements; and a maximum value of the plurality of samplings is determined as the quantity of light outputted from the optical element.

3. A light-quantity measuring method as claimed in claim 2, wherein:

a number of samplings between the maximum of samplings from an optical element and the maximum of samplings from another optical element are counted; and abnormality is alarmed when the counted number is not a specified number.

4. A light-quantity measuring method as claimed in claim 1, wherein:

optical elements which are in odd numbers in the array are driven and subjected to light-quantity measurement during an either forward or backward movement of the light-quantity sensor in the main scanning direction; and optical elements which are in even numbers in the array are driven and subjected to light-quantity measurement during an either forward or backward movement of the light-quantity sensor in the main scanning direction wherein the light-quantity measurement toward the optical elements which are in odd numbers in the array are not carried out.

5. A light-quantity measuring method as claimed in claim 1, wherein:

optical elements which are in odd numbers in the array are driven and subjected to light-quantity measurement during a reciprocal movement of the light-quantity sensor in the main scanning direction; and optical elements which are in even numbers in the array are driven and subjected to light-quantity measurement during another reciprocal movement of the light-quantity sensor in the main scanning.

6. A light-quantity measuring method as claimed in claim 1, wherein each of the optical elements is driven repeatedly under different conditions to output a plurality of different quantities of light.

7. A light-quantity measuring method as claimed in claim 1, wherein:

with respect to each of the optical elements, a quantity of light outputted therefrom during an on-period and a quantity of leakage light and a quantity of entering light during an off-period are measured; and a value calculated by multiplying the difference between the quantity of entering light and the quantity of leakage light by a correction coefficient and by adding the maximum measured value during the on-period to the value figured out by the multiplication is determined as the quantity of light of the optical element.

8. The light-quantity measuring method according to claim 1, wherein: in the moving step, the light-quantity sensor is moved at least two times; and in the driving step, the optical elements are driven under driving conditions that are mutually different, the mutually different driving conditions corresponding to the at least two times of movement of the light-quantity sensor, respectively.

9. An optical write device comprising:

an optical write head which drives an array of optical elements extending in a main scanning direction individually in accordance with image data;

a light-quantity sensor which has a light-receiving slit and is movable in the main scanning direction with the light-receiving slit facing the array of optical elements;

a driver which drives at least two of the optical elements in such a way that at least two adjacent optical elements of the optical elements are not driven at the same time during a movement of the light-quantity sensor in the main scanning direction; and a calculator which calculates a quantity of light outputted from each of the optical elements based on an output of the light-quantity sensor.

10. An optical write device as claimed in claim 9, wherein the driver drives the optical elements at a frequency and a duty which are substantially equal to those for actual image formation.

11. An optical write device as claimed in claim 9, wherein:

the optical write head is a full-color type which drives the optical elements while switching light among a plurality of colors at a high speed; and the driver drives the optical elements at a frequency suitable for each of the colors.

12. An optical write device as claimed in claim 11, wherein:

the optical write head carries out switches of the light color at a lower speed during light-quantity measurement than during actual image formation; and the driver turns on and off each of the optical elements a plurality of times during lighting of each of the colors.

13. The optical write device according to claim 9, wherein: the light-quantity sensor moves at least two times; and the driver drives the optical elements in accordance with driving conditions that are mutually different, the mutually different driving conditions corresponding to the at least two times of movement of the light-quantity sensor, respectively.

14. An optical write device comprising:

an array of optical elements extending in a main scanning direction individually driven in accordance with image data;

a light sensor unit capable of moving in the main scanning direction; and a controller which commands thin-out driving, wherein at least two of the optical elements are driven in such a way that at least two adjacent optical elements of said optical elements are not driven at the same time, to the optical elements while the light sensor unit is moving in the main scanning direction.

15. A method for measuring a quantity of light emitted from an optical write device which drives an array of optical elements extending in a main scanning direction individually in accordance with image data, the method comprising the steps of:

addressing each of the optical elements based on an output of a photosensor which is moved in the main scanning direction during thin-out driving of at least one optical element wherein optical elements adjacent thereto are not driven simultaneously with the drive of the optical element;

measuring a quantity of light outputted from each of the optical elements by moving the photosensor in the main scanning direction during all driving of optical elements wherein a plurality of serial optical elements are driven at a time under a specified condition; and determining a quantity of light outputted from each of the optical elements based on the addresses of the optical elements which have been recognized from the output of the photosensor during the thin-out driving and measured values during the all driving.

16. A light-quantity measuring method as claimed in claim 15, wherein:

the addressing step is carried out while optical elements at uniform intervals are driven; and the light-quantity measuring step is carried out while all the optical elements are driven.

17. A light-quantity measuring method as claimed in claim 15, wherein the addressing step comprises the steps of:

applying a driving signal with a specified frequency to the optical element which is to be thin-out driven so that the optical element is turned on and off repeatedly;

integrating values detected by the photosensor during each on-period and off-period of the optical element; and determining the address of the optical element from a maximum of the integrated values.

18. A light-quantity measuring method as claimed in claim 17, wherein addressing of undriven optical elements is carried out by uniformly dividing an interval between the addresses of driven optical elements.

19. A light-quantity measuring method as claimed in claim 15, wherein the photosensor comprises three color sensors which receive lights of three primary colors respectively.

20. A light-quantity measuring method as claimed in claim 19, wherein a driving voltage to drive the optical elements is a half-wave voltage for emission of blue light.

21. A method for measuring a quantity of light emitted from an optical write device which drives an array of optical elements extending in a main scanning direction individually in accordance with image data, the method comprising the steps of:

measuring quantities of light outputted from the optical elements by moving a photosensor in the main scanning direction while the optical elements other than a second element in the array are driven under a specified condition;

addressing the optical elements based on a maximum of detected values with respect to a first element in the array; and determining the quantities of light outputted from a third and succeeding elements in the array in consideration of the addresses of the optical elements.

22. A light-quantity measuring method as claimed in claim 21, wherein the addressing step comprises the steps of:

applying a driving signal with a specified frequency to the optical elements other than the second element so that the optical elements are turned on and off repeatedly;

integrating values detected by the photosensor during each on-period and off-period of each of the driven optical elements; and determining the address of each of the driven optical elements from a maximum of the integrated values.

23. A light-quantity measuring method as claimed in claim 22, wherein the address of the undriven second element is determined by uniformly dividing an interval between the address of the first element and the address of the third element.

24. A light-quantity measuring method as claimed in claim 21, wherein the photosensor comprises three color sensors which receive lights of three primary colors respectively.

25. A light-quantity measuring method as claimed in claim 24, wherein a driving voltage to drive the optical elements is a half-wave voltage for emission of blue light.

26. A method for measuring a quantity of light emitted from an optical write device which drives an array of optical elements extending in a main scanning direction individually in accordance with image data, the method comprising the steps of:

driving the optical elements in order in a pattern of driving a group of serial optical elements and an optical element apart from the group of elements at an interval of at least one element at a time;

measuring a quantity of light outputted from each of the optical elements with a first photosensor and a second photosensor which are moved in the main scanning direction keeping an interval therebetween, the interval corresponding to the interval between the group of driven serial elements and the other driven element;

addressing the optical elements based on values detected by the first photosensor and determining the quantities of light outputted from the optical elements based on the addresses of the optical elements and values detected by the second photosensor.

27. A light-quantity measuring method as claimed in claim 26, wherein the second photosensor comprises three color sensors which receive lights of three primary colors respectively.

28. A light-quantity measuring method as claimed in claim 27, wherein a driving voltage to drive the optical elements is a half-wave voltage for emission of blue light.

29. An optical write device comprising:

an optical write head which drives an array of optical elements extending in a main scanning direction individually in accordance with image data;

a photosensor which is movable in the main scanning direction facing the array of optical elements;

a first controller which addresses the optical elements based on an output of the photosensor while the photosensor is moved in the main scanning direction during thin-out driving of at least one optical element wherein optical elements adjacent thereto are not driven simultaneously with the drive of the optical element;

a second controller which measures quantities of light outputted from the optical elements by moving the photosensor in the main scanning direction during all driving of optical elements wherein a plurality of serial optical elements are driven at a time under a specified condition; and a calculator which determines a quantity of light outputted from each of the optical elements based on the addresses of the optical elements which have been recognized from the output of the photosensor during the thin-out driving and measured values during the all driving.

30. An optical write device as claimed in claim 29, wherein:
the first controller commands a simultaneous drive of optical elements at uniform intervals; and
the second controller commands a simultaneous drive of all the optical elements.

31. An optical write device as claimed in claim 29, wherein the photosensor comprises three color sensors which receive lights of three primary colors respectively.

32. An optical write device as claimed in claim 31, wherein a driving voltage to drive the optical elements is a half-wave voltage for emission of blue light.

33. An optical write device comprising:
an optical write head which drives an array of optical elements extending in a main scanning direction individually in accordance with image data;
a photosensor which is movable in the main scanning direction facing the optical elements;
a controller which moves the photosensor in the main scanning direction to measure quantities of light outputted from the optical elements while the optical elements other than a second element in the array are driven;
a calculator which addresses the optical elements based on a maximum of detected values with respect to a first element in the array and determines the quantities of light outputted from a third and succeeding elements in consideration of the addresses of the optical elements.

34. An optical write device as claimed in claim 33, wherein the photosensor comprises three color sensors which receive lights of three primary colors respectively.

35. An optical write device as claimed in claim 34, wherein a driving voltage to drive the optical elements is a half-wave voltage for emission of blue light.

36. An optical write device comprising:
an optical write head which drives an array of optical elements extending in a main scanning direction individually in accordance with image data;
a first photosensor and a second photosensor which are located at a specified interval and are movable in the main scanning direction facing the array of optical elements;
a controller which moves the photosensors in the main scanning direction to measure quantities of light outputted from the optical elements while driving the optical elements in order in a pattern of driving an optical element and a group of serial optical elements which is at a distance from the optical element, the distance corresponding to the interval between the photosensors, at a time; and
a calculator which addresses the optical elements based on values detected by the first photosensor and determines the quantities of light outputted from the optical elements based on the addresses of the optical elements and values detected by the second photosensor.

37. An optical write device as claimed in claim 36, wherein the second photosensor comprises three color sensors which receive lights of three primary colors respectively.

38. An optical write device as claimed in claim 37, wherein a driving voltage to drive the optical elements is a half-wave voltage for emission of blue light.

39. An image forming apparatus comprising:
an optical write head which drives an array of optical elements extending in a main scanning direction individually in accordance with image data;
a recording medium which moves in a sub scanning direction on a focal position of light emergent from the optical write head;
a deflecting member which deflects the light emergent from the optical write head;
a photosensor which receives light deflected by the deflecting member; and
moving mechanism which moves the deflecting member and the photosensor together in the main scanning direction.

40. An image forming apparatus as claimed in claim 39, wherein the deflecting member and the photosensor are in a retreating position outside an image forming area of the recording medium while the optical write head is carrying out image writing.

41. An image forming apparatus as claimed in claim 40, wherein the light emergent from the optical write head is partly incident to the photosensor which is in the retreating position.

42. An image forming apparatus as claimed in claim 39, wherein the optical write head, the deflecting member, the photosensor and the moving mechanism are assembled as a unit.

43. An image forming apparatus as claimed in claim 39, wherein the moving mechanism moves the photosensor in the main scanning direction by a distance which is variable in accordance with a width of the recording medium.

44. An image forming apparatus comprising:
a plurality of optical write heads each of which drives an array of optical elements extending in a main scanning direction individually in accordance with image data;
a recording station which moves a recording medium in a sub scanning direction on a focal position of light emergent from the optical write heads; and
a light-quantity measuring unit which has at least one light receiving element for receiving light from the optical write heads and moves the light receiving element in the main scanning direction.

45. An image forming apparatus as claimed in claim 44, wherein:
the light-quantity measuring unit has a plurality of light-receiving elements for receiving light from the optical write heads respectively and moves the light-receiving elements together in the main scanning direction; and
light-quantity measurement and production of light-quantity correction data with respect to all the optical write heads are carried out simultaneously during a movement of the light-receiving elements in the main scanning direction.

46. An image forming apparatus as claimed in claim 44, wherein light-quantity measurement and production of light-quantity correction data with respect to each of the optical write heads are carried out during a movement of the light receiving element in the main scanning direction, so that the light receiving element moves in the main scanning direction a plurality of times for light-quantity measurement and production of light-quantity correction data with respect to all the optical write heads.

47. An image forming apparatus comprising:

a plurality of optical write heads each of which drives an array of optical elements extending in a main scanning direction individually in accordance with image data;

a recording station which transports a recording medium in a sub scanning direction on a focal position of light emergent from the optical write heads;

a light-quantity measuring unit which has a single light-receiving element, shifts the light-receiving element among positions to receive light from the optical write heads respectively and moves the light-receiving element in the main scanning direction.

48. An image forming apparatus as claimed in claim 47, wherein light-quantity measurement and production of light-quantity correction data with respect to each of the optical write heads are carried out during a movement of the light receiving element in the main scanning direction.

* * * * *